United States Patent
Teraoka et al.

(10) Patent No.: US 10,514,900 B2
(45) Date of Patent: Dec. 24, 2019

(54) SOFTWARE UPDATING APPARATUS AND SOFTWARE UPDATING METHOD

(71) Applicant: HITACHI AUTOMOTIVE SYSTEMS, LTD., Hitachinaka-shi, Ibaraki (JP)

(72) Inventors: Hidetoshi Teraoka, Tokyo (JP); Kenichi Kurosawa, Hitachinaka (JP); Fumiharu Nakahara, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/545,949

(22) PCT Filed: Feb. 10, 2016

(86) PCT No.: PCT/JP2016/053952
§ 371 (c)(1),
(2) Date: Jul. 24, 2017

(87) PCT Pub. No.: WO2016/147766
PCT Pub. Date: Sep. 22, 2016

(65) Prior Publication Data
US 2018/0018160 A1 Jan. 18, 2018

(30) Foreign Application Priority Data
Mar. 16, 2015 (JP) .................. 2015-051595

(51) Int. Cl.
*G06F 8/65* (2018.01)
*B60R 16/02* (2006.01)
(Continued)

(52) U.S. Cl.
CPC ............... *G06F 8/65* (2013.01); *B60R 16/02* (2013.01); *B60R 16/023* (2013.01); *G06F 9/445* (2013.01);
(Continued)

(58) Field of Classification Search
CPC ..... G06F 8/61; G06F 8/65; G06F 8/67; G06F 8/68; G06F 8/71
(Continued)

(56) References Cited

U.S. PATENT DOCUMENTS

2007/0076593 A1* 4/2007 Sakurai ............. B60W 50/0205
370/219
2007/0294685 A1 12/2007 Oh
(Continued)

FOREIGN PATENT DOCUMENTS

EP 0811942 A2 12/1997
JP 2010-218070 A 9/2010
(Continued)

OTHER PUBLICATIONS

International Search Report and Written Opinion for PCT App No. PCT/JP2016/053952 dated May 17, 2016, 9 pgs.
(Continued)

*Primary Examiner* — Evral E Bodden
(74) *Attorney, Agent, or Firm* — Procopio, Cory, Hargreaves & Savitch LLP

(57) ABSTRACT

Provided is a software updating apparatus that can flexibly respond to various situations, including update capacity and use cases of each ECU, in a case of updating control information of a plurality of ECUs. Update control information necessary for update processing, including update data to be newly applied to an ECU, is received from a server and control of the update processing is performed based on the received update control information.

11 Claims, 19 Drawing Sheets

(51) Int. Cl.
*G06F 9/445* (2018.01)
*G06F 11/00* (2006.01)
*B60R 16/023* (2006.01)
*H04L 29/08* (2006.01)

(52) U.S. Cl.
CPC .............. *G06F 11/00* (2013.01); *H04L 67/12* (2013.01); *H04L 67/34* (2013.01); *Y02D 10/42* (2018.01)

(58) Field of Classification Search
USPC .......................................................... 717/173
See application file for complete search history.

(56) References Cited

U.S. PATENT DOCUMENTS

| | | | |
|---|---|---|---|
| 2011/0197187 A1 | 8/2011 | Roh | |
| 2013/0080580 A1 | 3/2013 | Nagai et al. | |
| 2013/0145141 A1 | 6/2013 | Han et al. | |
| 2014/0114497 A1* | 4/2014 | Miyake | H04L 9/32 701/1 |
| 2014/0282470 A1* | 9/2014 | Buga | G06F 8/65 717/170 |
| 2015/0200804 A1* | 7/2015 | Lee | H04L 41/082 709/221 |
| 2015/0227359 A1* | 8/2015 | Todoroki | G06F 8/65 717/169 |
| 2015/0301822 A1 | 10/2015 | Takahashi et al. | |
| 2016/0170775 A1* | 6/2016 | Rockwell | G06F 8/65 713/100 |
| 2016/0203652 A1* | 7/2016 | Throop | G07C 5/008 701/36 |
| 2017/0134164 A1* | 5/2017 | Haga | H04L 9/085 |
| 2018/0032324 A1* | 2/2018 | Sarkar | G06F 8/65 |

FOREIGN PATENT DOCUMENTS

| | | |
|---|---|---|
| JP | 2011-070307 A | 4/2011 |
| JP | 2012-043118 A | 3/2012 |
| JP | 2012-069131 A | 4/2012 |
| JP | 2013-073417 A | 4/2013 |
| JP | 2013-084143 A | 5/2013 |
| JP | 2014-106875 A | 6/2014 |
| WO | 2014/030044 A2 | 2/2014 |

OTHER PUBLICATIONS

Extended European Search Report for related EP Application No. 16764597.7, dated Sep. 26, 2018; 9 pages.
European Examination Report directed to the EP counterpart application No. 16764597.7, dated Jul. 30, 2019; 5 pages.

\* cited by examiner

[Fig. 1]
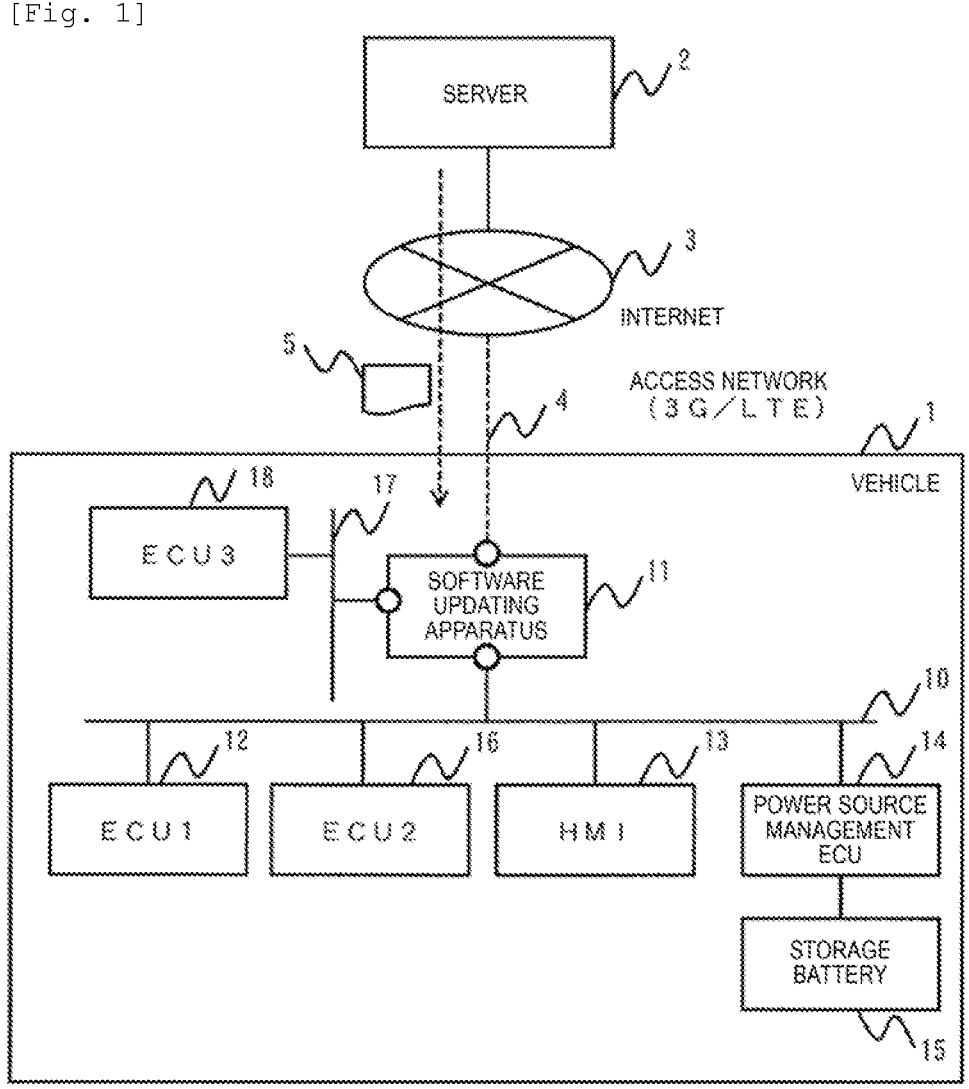

[Fig. 2(a)]
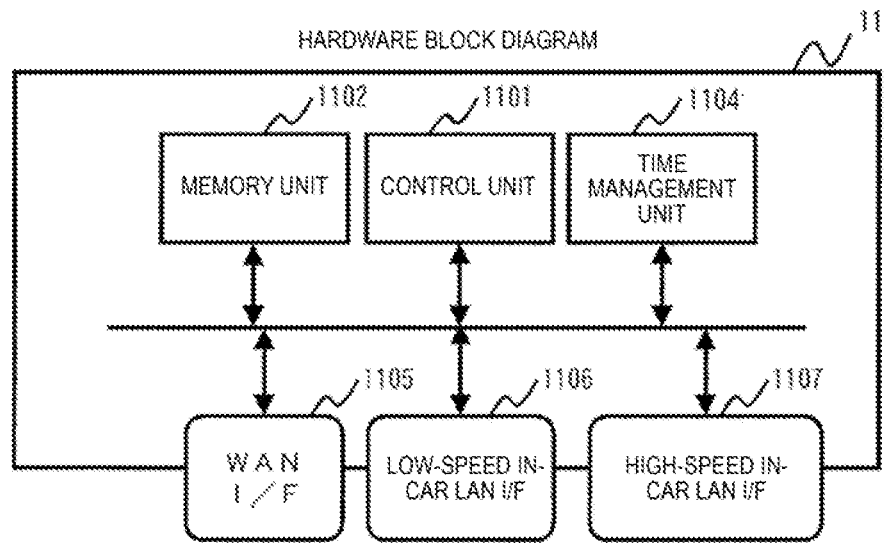
[Fig. 2(b)]
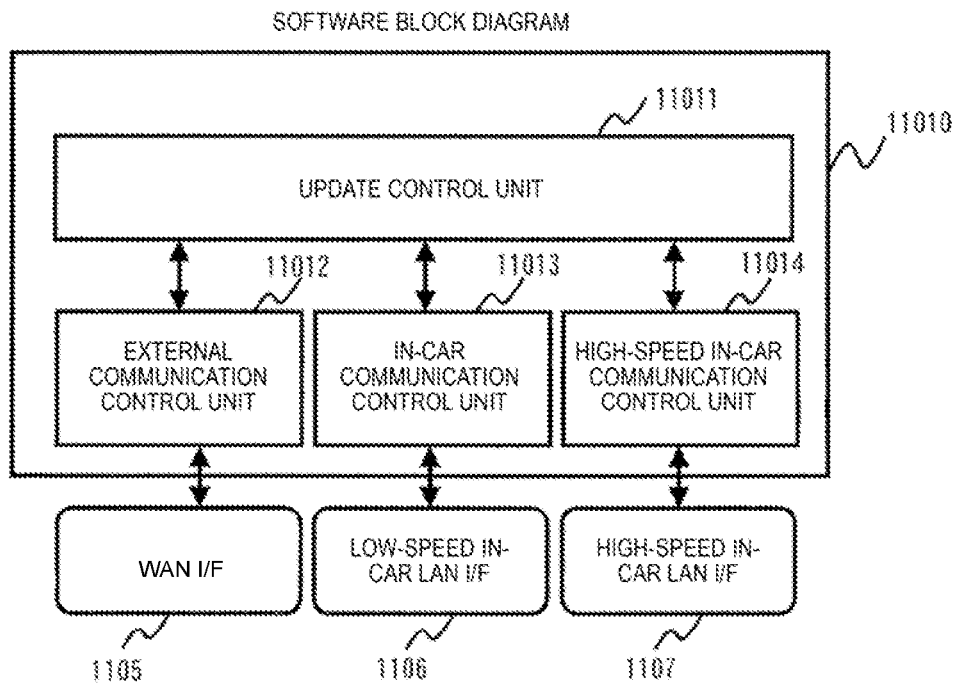

[Fig. 3(a)]
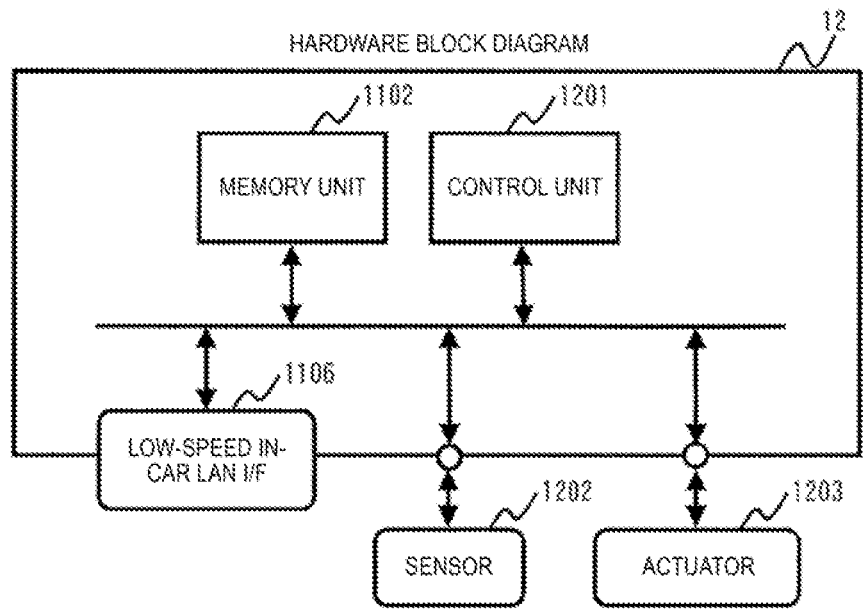
[Fig. 3(b)]
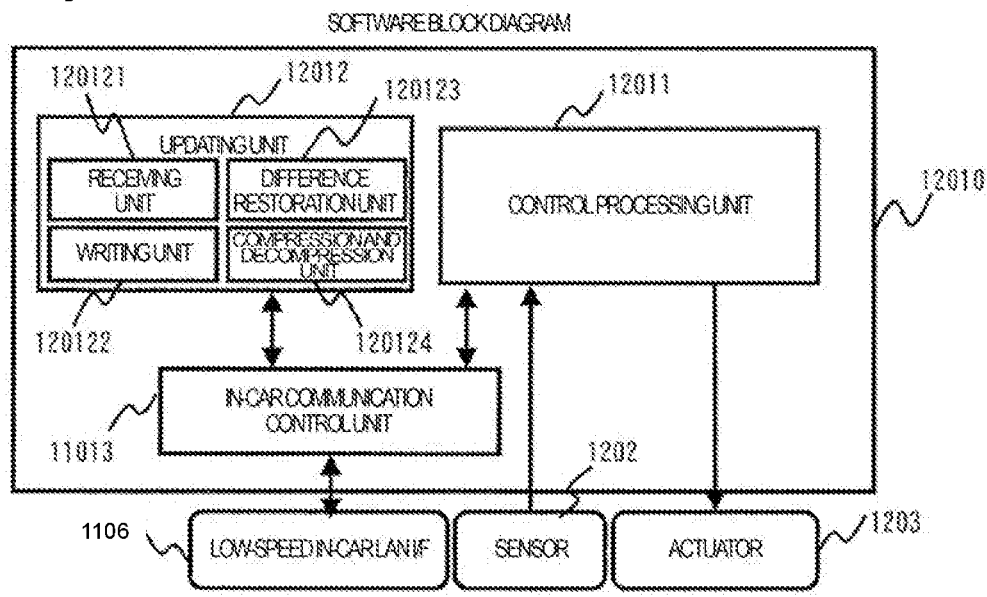

[Fig. 4]
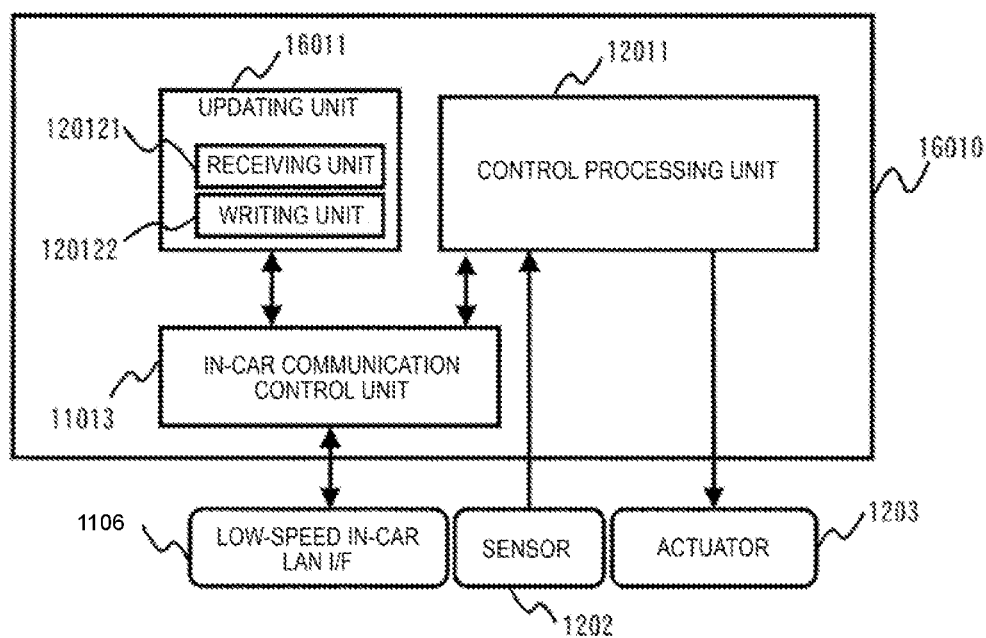

[Fig. 5]
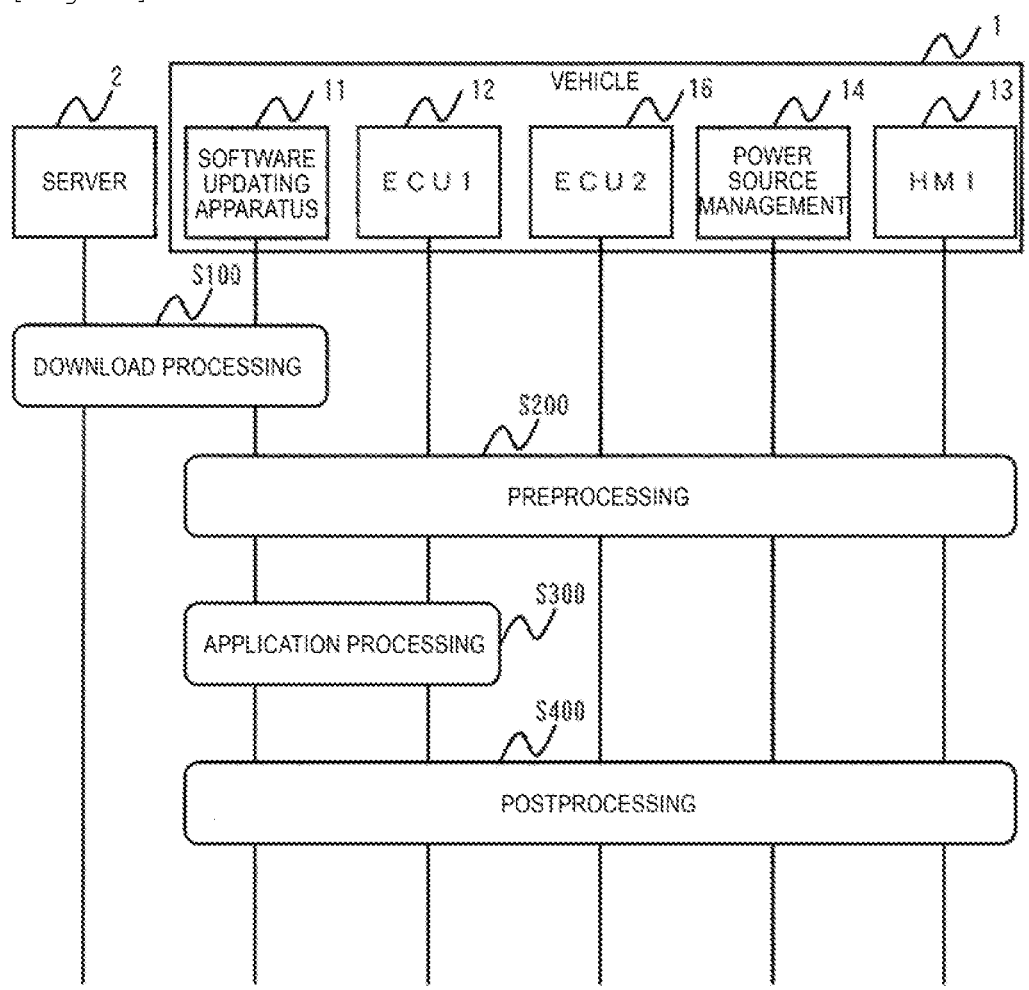

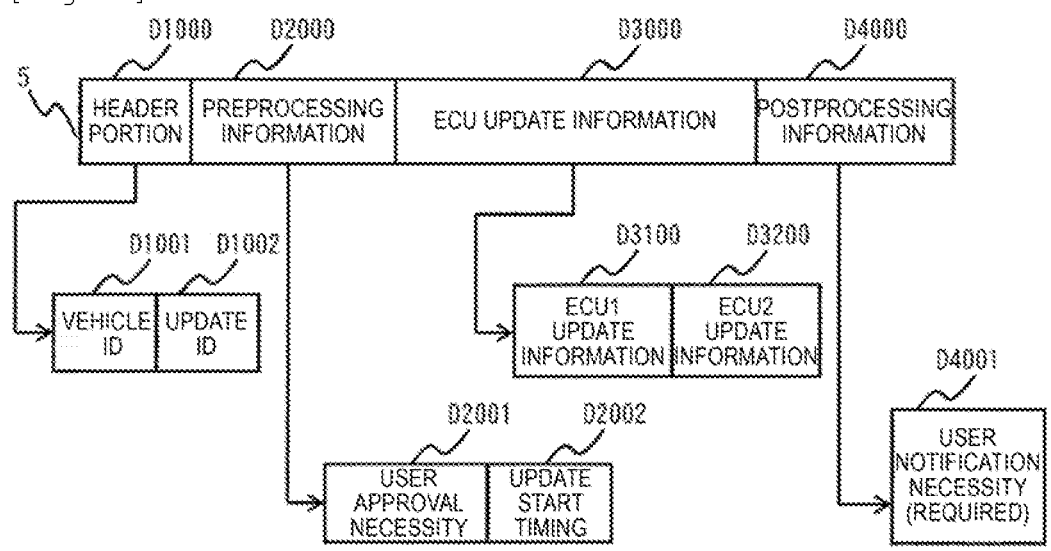
[Fig. 6]

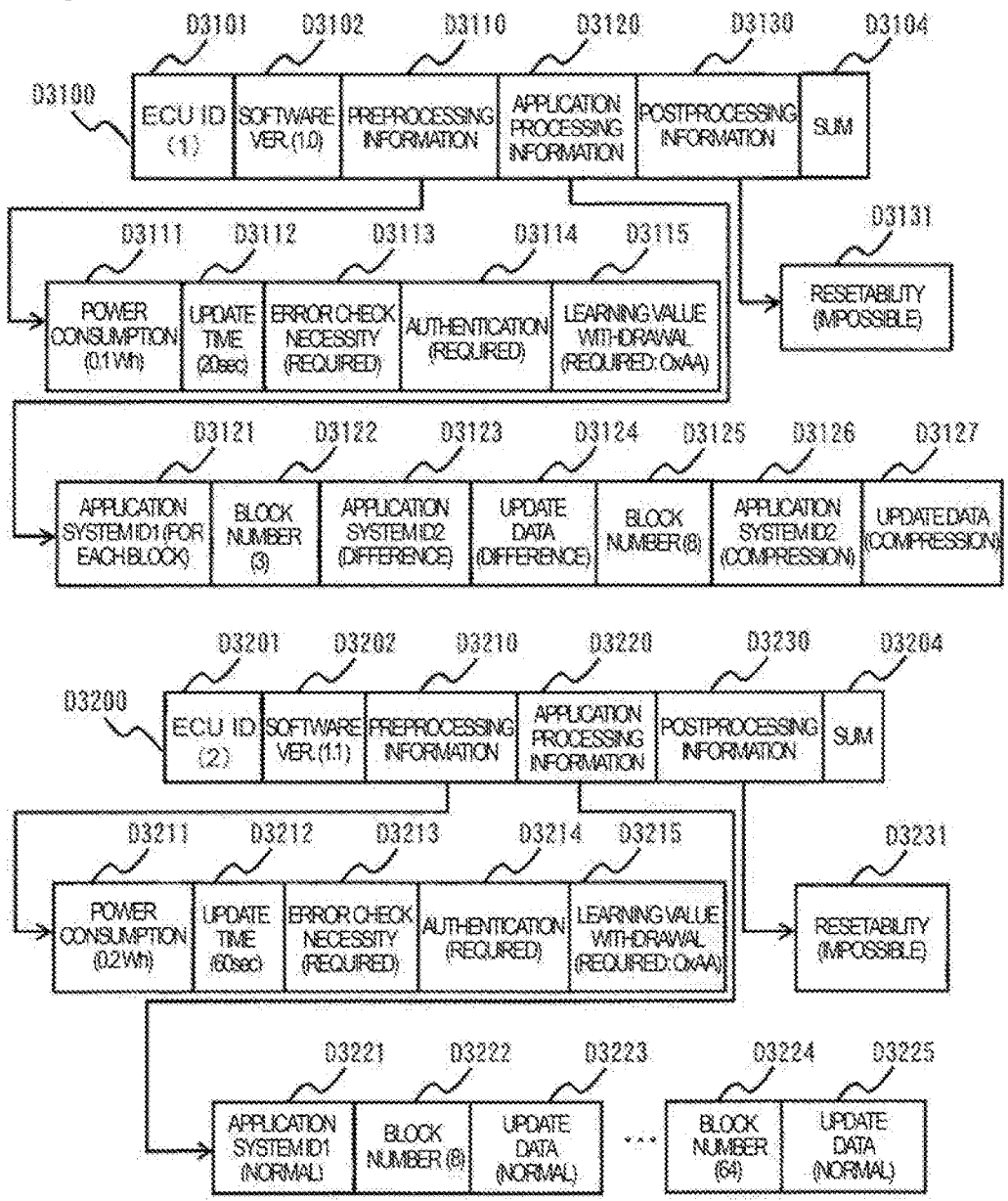
[Fig. 7]

[Fig. 8(a)]
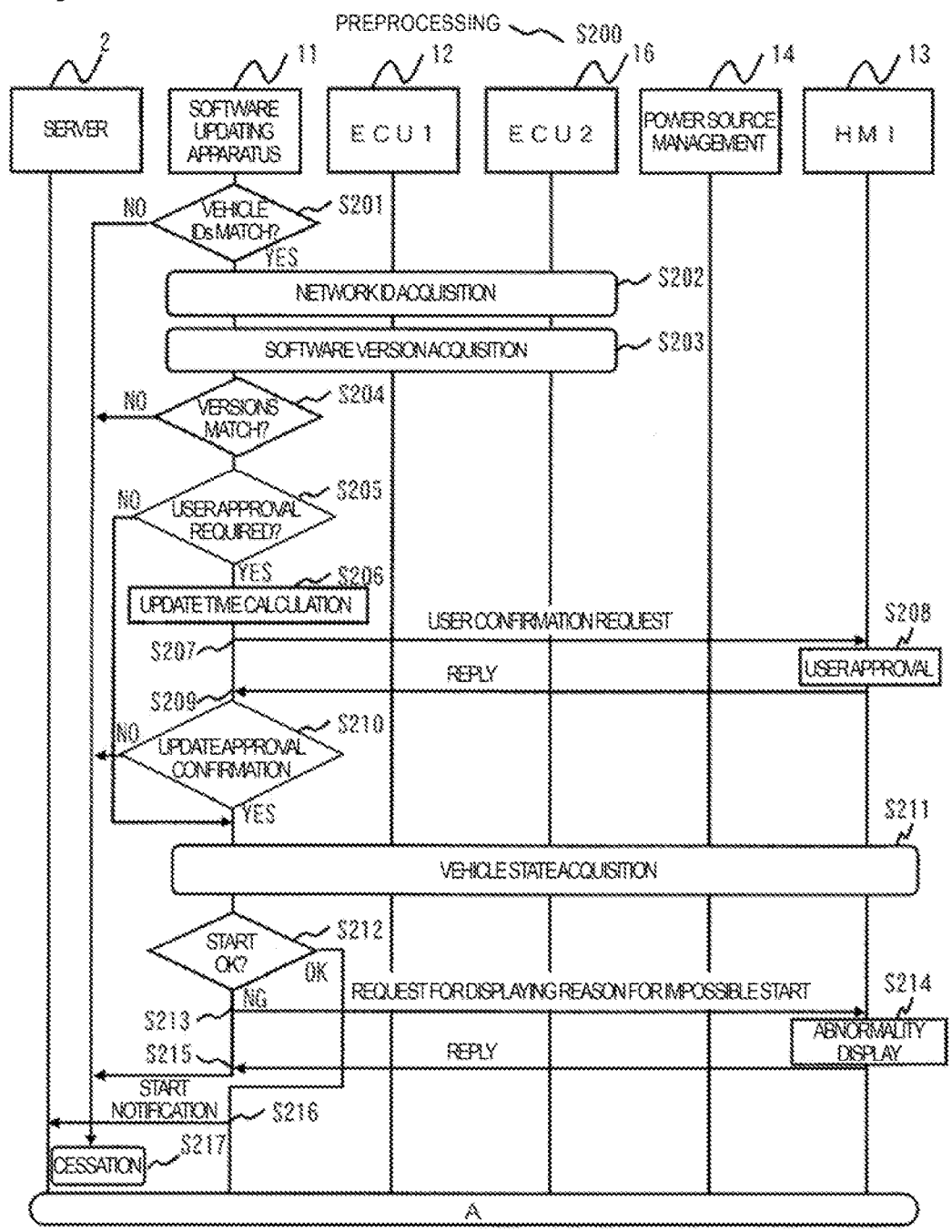

[Fig. 8(b)]
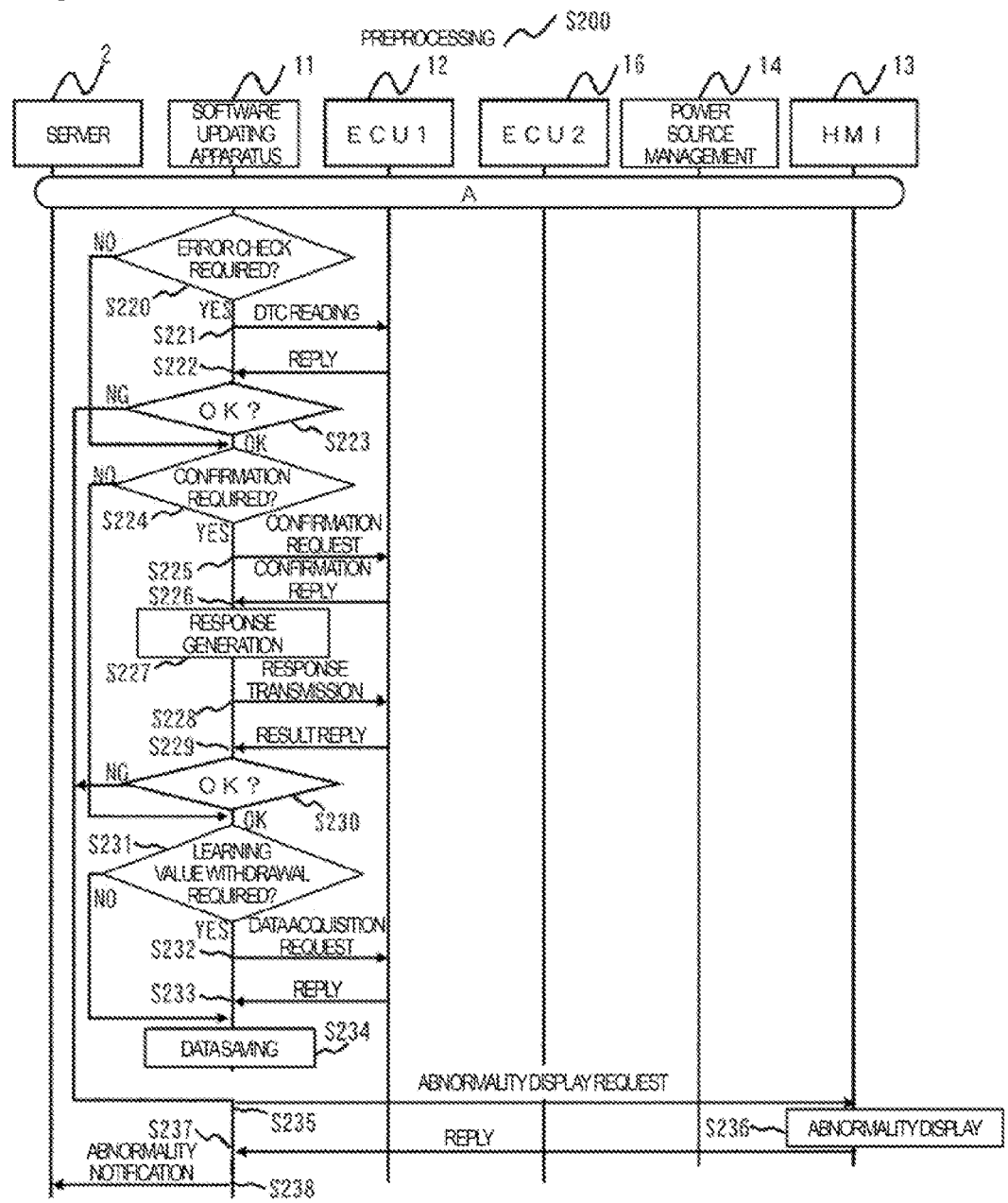

[Fig. 9(a)]
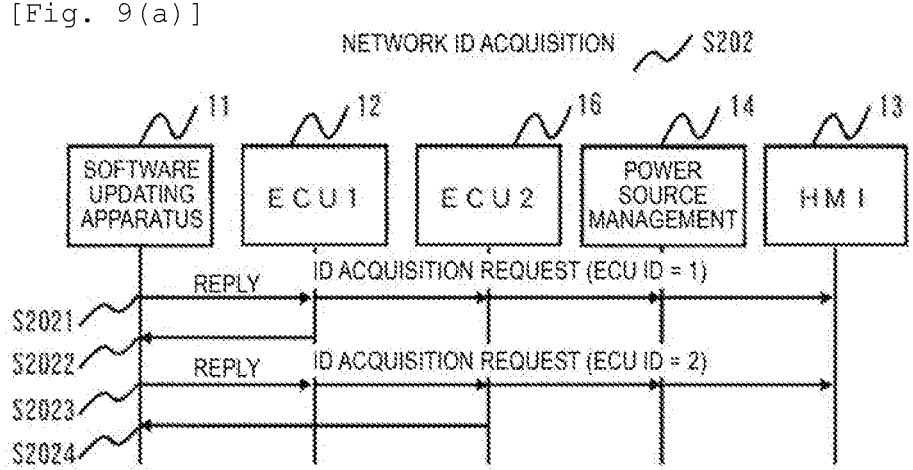
[Fig. 9(b)]
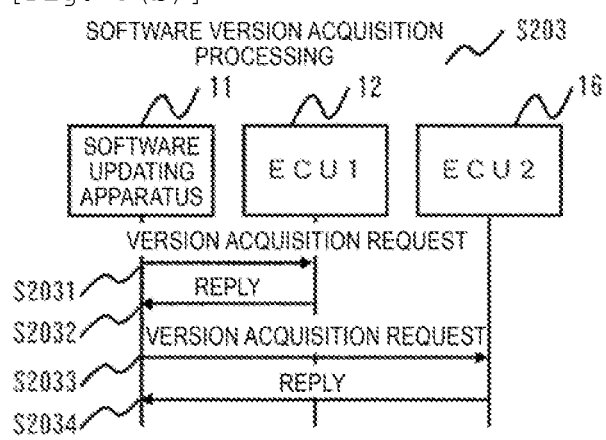
[Fig. 9(c)]
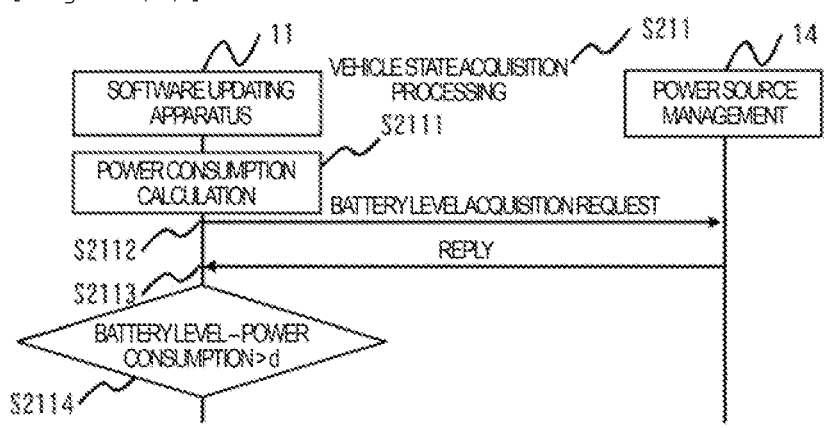

[Fig. 10]
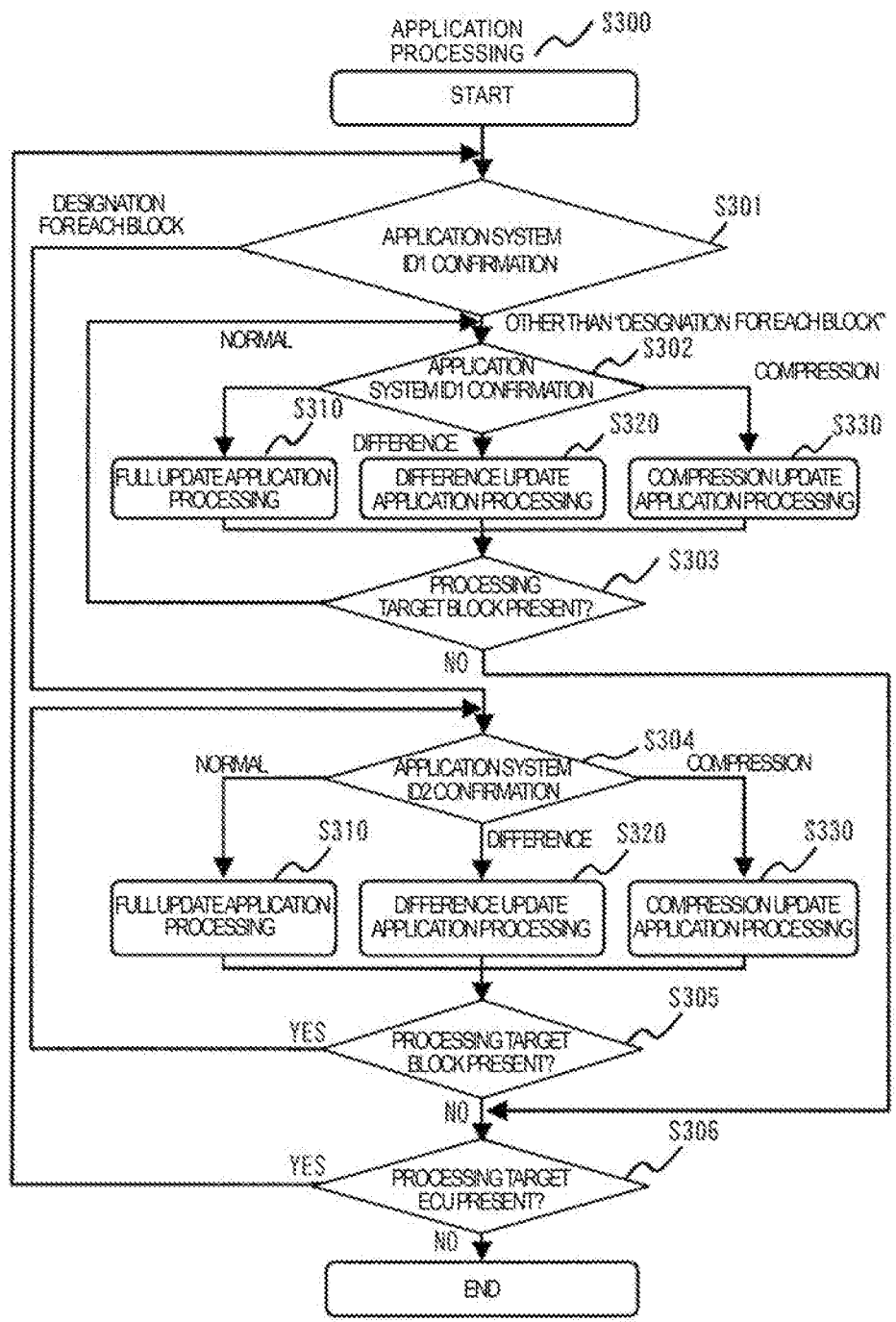

[Fig. 11(a)]
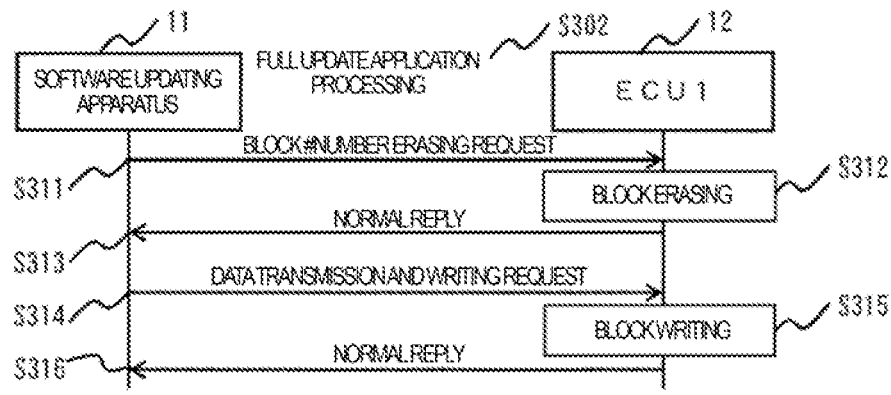
[Fig. 11(b)]
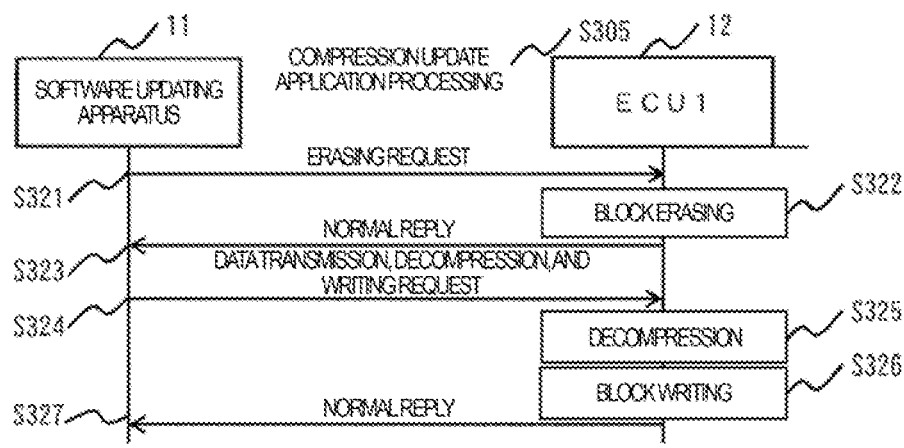
[Fig. 11(c)]
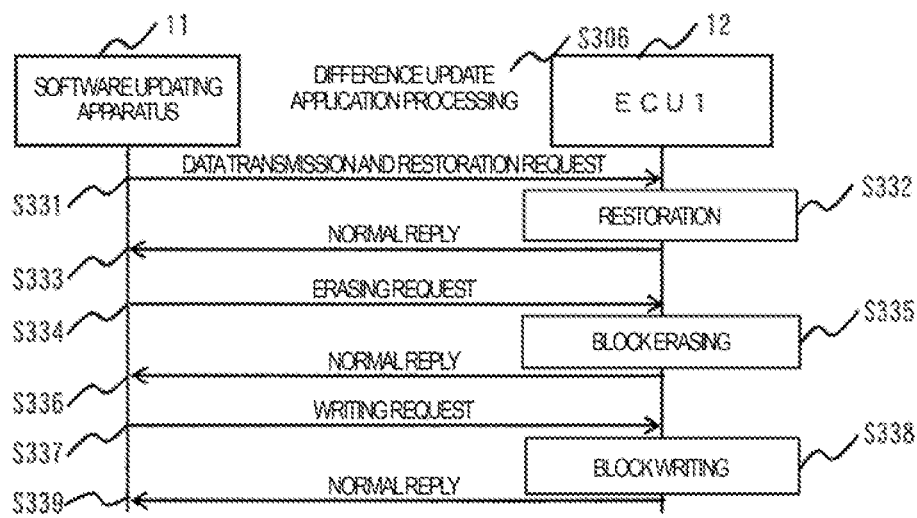

[Fig. 12]
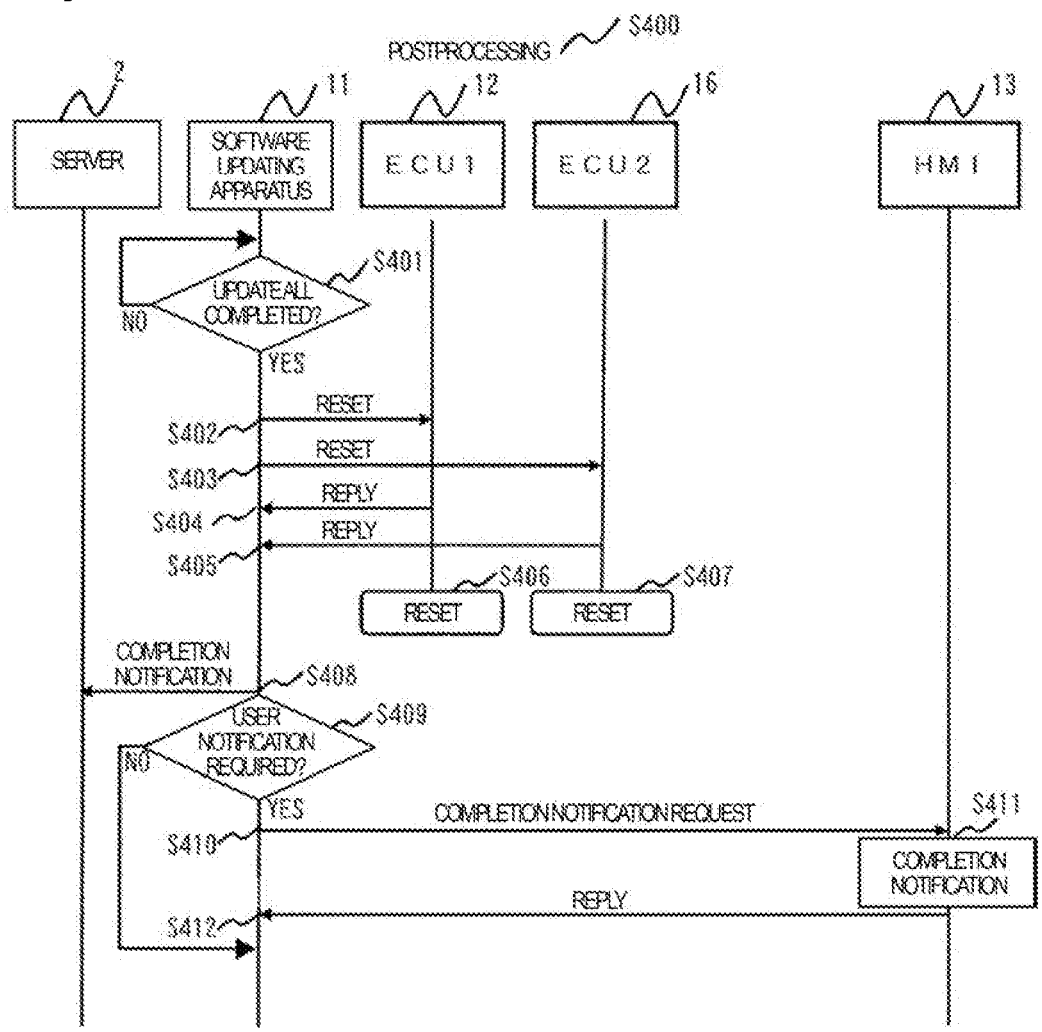

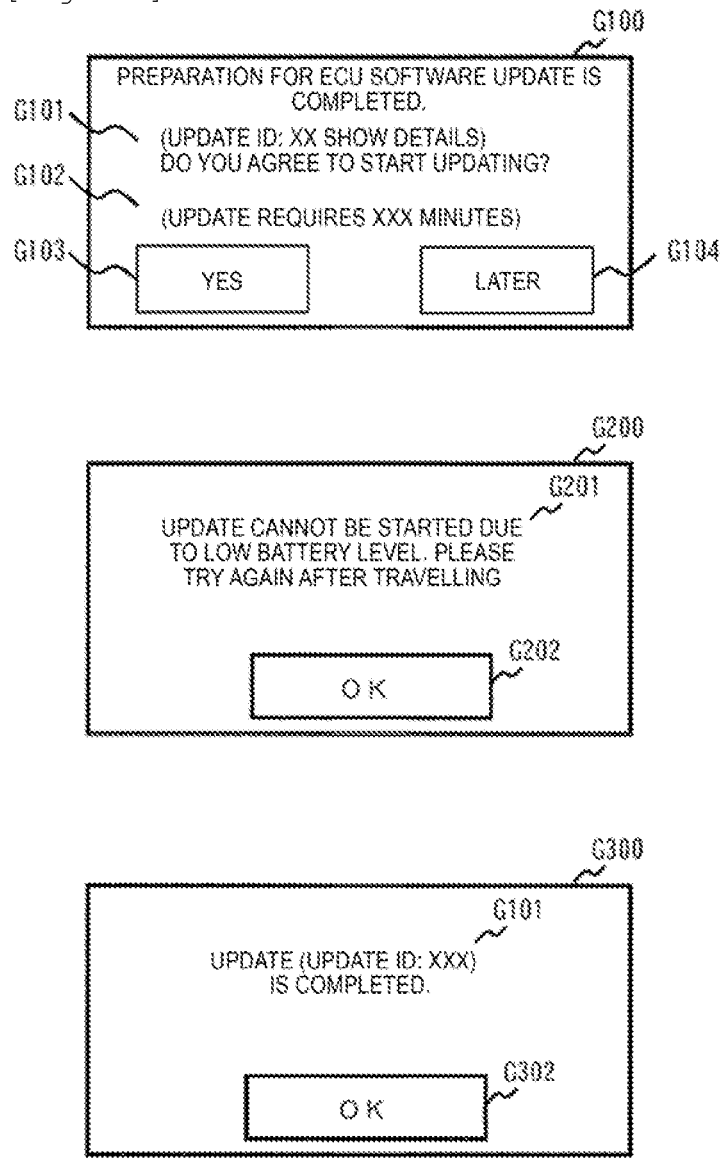
[Fig. 13]

[Fig. 14(a)]
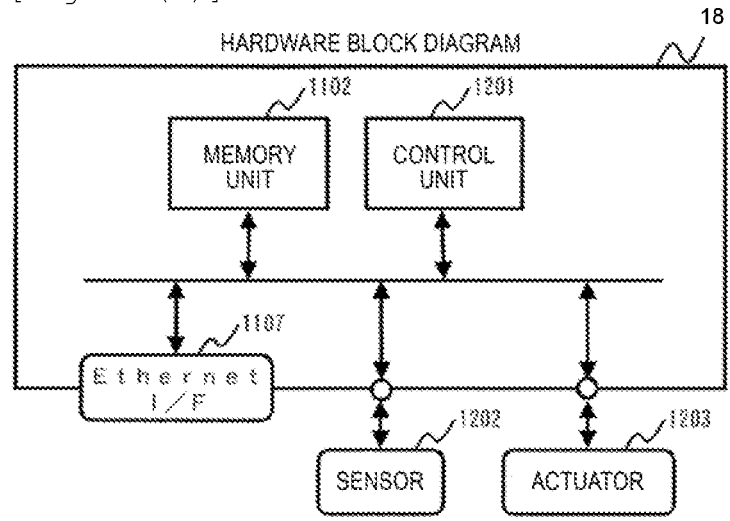
[Fig. 14(b)]
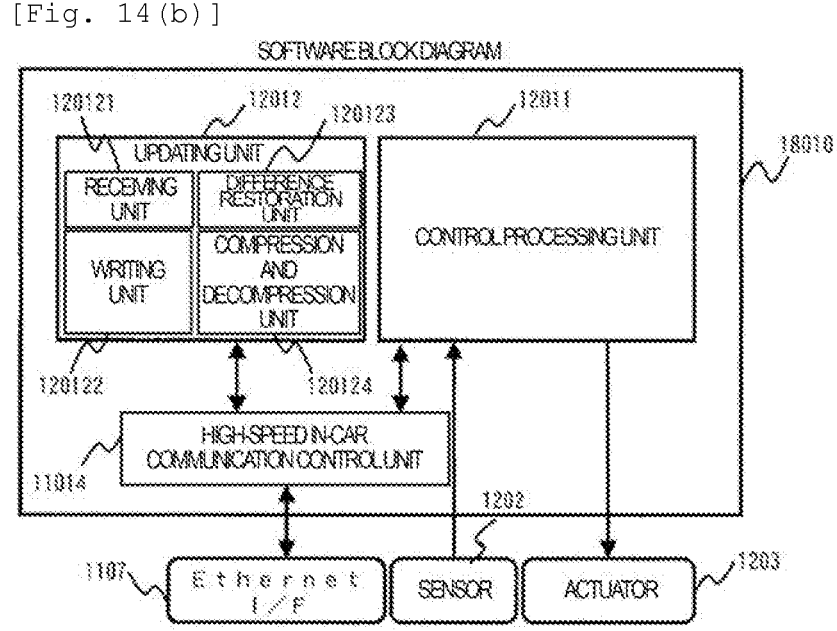

[Fig. 15]
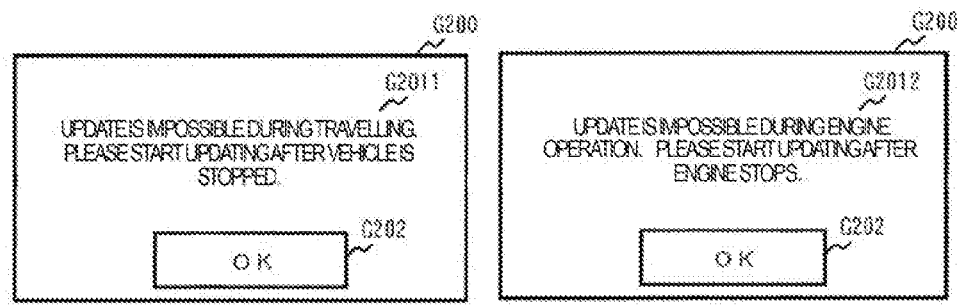
[Fig. 16(a)]
[Fig. 16(b)]
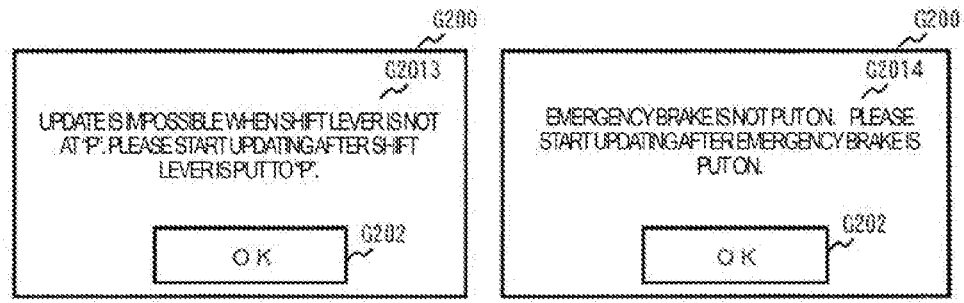

[Fig. 17]
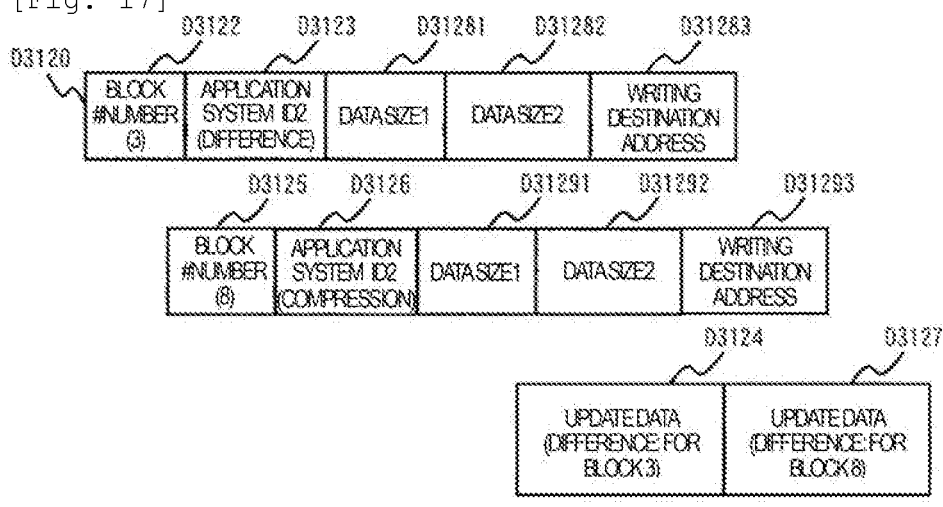
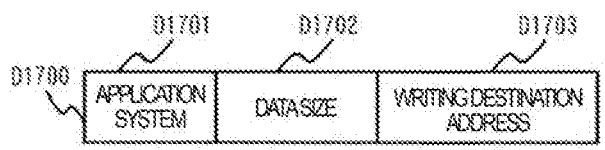
[Fig. 18(a)]
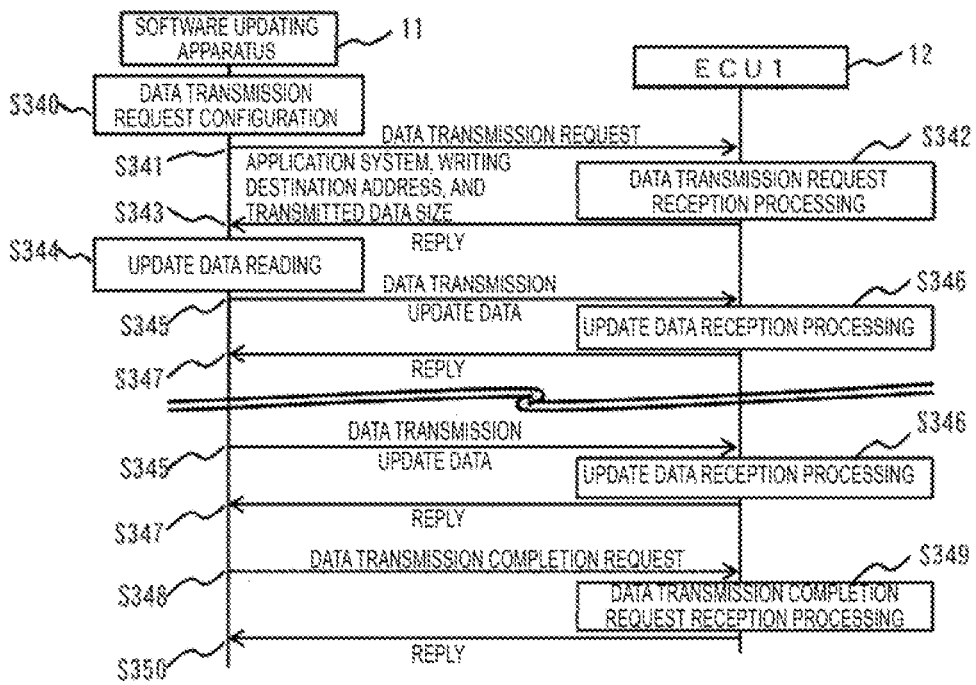

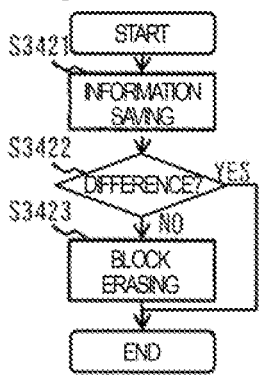
[Fig. 18(b)]
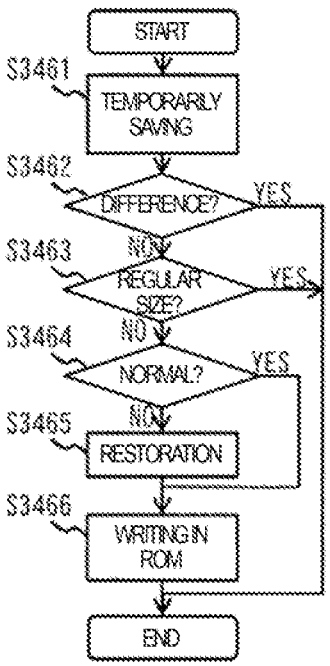
[Fig. 18(c)]

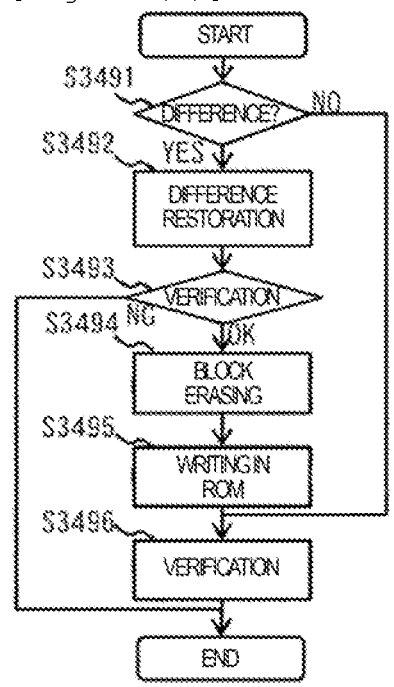

SOFTWARE UPDATING APPARATUS AND SOFTWARE UPDATING METHOD

TECHNICAL FIELD

The invention relates to a technique to effectively update control software of ECUs in an automobile system which is configured with diverse ECUs and of which configuration is likely to change at any time.

BACKGROUND ART

In recent years, with advances in driving support functions and automatic driving techniques, the scale of software installed in an electronic control apparatus (ECU: Electronic Control Unit) for an automobile has increased. In response to this, in addition, the number of recalls attributable to software defects increases along with the number of times and the number of units that are needed to be dealt with per time have increased.

Meanwhile, a connected car, which is an automobile wirelessly linked to a center system, has shown a sign of widespread use in response to advances in a communication network.

Under such circumstances, needs for a remote software updating technique for automobiles, in which a remote software updating technique that has been used in the related mobile phones and televisions is wirelessly applied to automobiles and remotely updates ECU software of the automobiles, are on the rise.

For example, in PTL1, an Over the Air (OTA) software updating system that remotely updates software of a mobile terminal is disclosed.

In PTL1, a technique that achieves improved efficiency of update processing by extracting a difference between a program before and after updating and applying this difference is disclosed.

CITATION LIST

Patent Literature

PTL 1: JP-A-2012-069131

SUMMARY OF INVENTION

Technical Problem

However, in an automobile system where a plurality of ECUs having diverse characteristics exist within one vehicle, in some cases, all of the ECUs cannot deal with a difference technique and whether it is better to transmit a difference or to apply normal update depends on an update situation or update content. In the technique disclosed in PTL1 where the fact that each of updating methods for a plurality of pieces of ECU software is different is not mentioned, the ECU software in such a case cannot be updated.

Solution to Problem

A representative software updating apparatus of the invention for solving the above problems is connected to a server and a plurality of control apparatuses and performs transmission and reception of data. The software updating apparatus includes a first communication unit that receives update data which is applied to each of the plurality of control apparatuses and update control information which is referred to apply the update data to each control apparatus from the server, a second communication unit that transmits the update data to be applied to each control apparatus, for each of the plurality of control apparatuses, and an update control unit that controls the plurality of control apparatuses via the second communication unit such that the update data is applied based on the update control information for each of the plurality of control apparatuses.

Advantageous Effects of Invention

According to the above means, even if it is an automobile system configured with a plurality of ECUs which require control software update processing different from each other, control software update of each ECU can be easily implemented with an appropriate method according to uses. Problems, configurations, and effects other than those described above will be clarified by description of the following embodiments.

BRIEF DESCRIPTION OF DRAWINGS

FIG. 1 is a block diagram illustrating a configuration example of a system.

FIG. 2(a) is a block diagram illustrating a hardware configuration example of a software updating apparatus.

FIG. 2(b) is a block diagram illustrating a software configuration example of the software updating apparatus.

FIG. 3(a) is a block diagram illustrating a hardware configuration example of an ECU1.

FIG. 3(b) is a block diagram illustrating a software configuration example of the ECU1.

FIG. 4 is a block diagram illustrating a configuration example of an ECU2.

FIG. 5 is a sequence diagram illustrating one example of software update processing.

FIG. 6 is a configuration example of update information 5 acquired by a software updating apparatus 11 from a server 2.

FIG. 7 is a configuration example of ECU update information.

FIG. 8(a) is a sequence diagram illustrating one example of preprocessing.

FIG. 8(b) is a sequence diagram illustrating one example of the preprocessing.

FIG. 9(a) is a sequence diagram illustrating one example of network ID acquisition processing.

FIG. 9(b) is a sequence diagram illustrating one example of software version acquisition processing.

FIG. 9(c) is a sequence diagram illustrating one example of vehicle state acquisition processing.

FIG. 10 is a flow chart illustrating one example of application processing in the software updating apparatus.

FIG. 11(a) is a sequence diagram illustrating one example of full update application processing.

FIG. 11(b) is a sequence diagram illustrating one example of compression update application processing.

FIG. 11(c) is a sequence diagram illustrating one example of difference update application processing.

FIG. 12 is a sequence diagram illustrating one example of postprocessing.

FIG. 13 is an example of a screen of an HMI.

FIG. 14(a) is a block diagram illustrating a hardware configuration example of an ECU3.

FIG. 14(b) is a block diagram illustrating a software configuration example of the ECU3.

FIG. 15 is a configuration example of ECU1 update information and ECU3 update information.

FIG. 16(a) is a configuration example of preprocessing information of the ECU1 update information.

FIG. 16(b) is an example of a screen that presents a reason and a solution for a case of a state where a vehicle cannot start software update.

FIG. 17 is a configuration example of the ECU1 update information.

FIG. 18(a) is a flow chart illustrating one example of update application processing of the ECU1.

FIG. 18(b) is a flow chart illustrating one example of data transmission request reception processing of the ECU1.

FIG. 18(c) is a flow chart illustrating one example of update data reception processing of the ECU1.

FIG. 18(d) is a flow chart illustrating one example of data transmission completion request reception processing of the ECU1.

DESCRIPTION OF EMBODIMENTS

Hereinafter, embodiments to implement the invention will be described with reference to the drawings. In the drawings, the same reference signs indicate the same or corresponding portions. In addition, the invention is not limited to illustrated examples.

Example 1

In this example, an updating method for a program of an ECU of a vehicle in the invention will be described. Hereinafter, although a case where the program is updated will be described, the technique is applicable to overall control information necessary for controlling the ECU including a program, such as parameters and data.

<System Configuration>

FIG. 1 is a configuration example of a software updating system of this example.

The software updating system of this example is configured with a vehicle 1, a server 2, the Internet 3 that links an access network and a base, an access network 4 provided by a communication service provider.

The vehicle 1 is configured with a low-speed in-car network 10, a high-speed in-car network 17, a software updating apparatus 11, ECUs 12, 16, and 18, a Human Machine Interface (HMI) 13, a power source management ECU 14, and a storage battery 15.

The software updating apparatus 11 performs update of the program of the ECU connected via a personal device and an in-car network.

The ECUs 12 and 16 are connected to the low-speed in-car network 10 and perform control necessary for the vehicle to realize functions, including travelling.

The ECU3 18 is connected to the high-speed in-car network 17 and performs control necessary for the vehicle to realize functions, including travelling.

The HMI 13 presents information to a user or receives input from the user.

The power source management ECU 14 manages a state of the storage battery 15.

In addition, although not illustrated in FIG. 1, each configuration element within the vehicle, including the software updating apparatus 11 and the ECU1 12, is connected to a storage battery by means of a power line and receives power supply.

In this configuration, update information 5 necessary for updating the program is distributed from the server 2 to the ECU via the software updating apparatus 11 and a new program is applied to the ECU.

In this example, the Internet Protocol (IP) is used as a network protocol in the Internet 3 and the access network 4 and the User Datagram Protocol (UDP) and the Transmission Control Protocol (TCP) are used for a higher-level transport protocol. There are different versions of the IP, IPv4 and IPv6, and this example is not limited to any one of IPv4 and IPv6.

FIG. 2(a) is a block diagram illustrating a hardware configuration of the software updating apparatus 11.

The software updating apparatus 11 is configured with a control unit 1101, a memory unit 1102, a time management unit 1104, a WAN (I/F) 1105, a low-speed in-car LAN interface (I/F) 1106, and a high-speed in-car LAN I/F 1107.

The control unit 1101 executes a control program and causes the software updating apparatus 11 to function by controlling other configuration elements within the software updating apparatus 11 and giving instruction of data transmission and reception to and from other devices connected over the in-car network and a server connected via the access network.

The memory unit 1102 is configured of a volatile memory and a nonvolatile memory (ROM: Read Only Memory). The nonvolatile memory stores the control program and control information for operating the software updating apparatus 11, including necessary parameters. The volatile memory temporarily stores a part of the control program and data necessary for operating the control program. In addition, in accordance with instruction from the control unit 1101, the volatile memory keeps data under instruction, including connected apparatus information.

The time management unit 1104 is provided with a real time clock (RTC) and manages time using a Network Time Protocol (NTP) server that exists on the access network 4 or the Internet 3 or time information provided by the Global Positioning System (GPS). The NTP is a protocol for synchronizing a clock of a device, which is the device connected to the network, with the correct time.

The Wide Area Network (WAN) I/F 1105 performs transmission and reception of data to and from the server connected to the Internet 3 via the access network 4 according to the instruction from the control unit 1101. The WAN I/F 1105 is configured as a wired communication unit or a wireless communication unit.

The low-speed in-car LAN I/F 1106 performs transmission and reception of data to and from the ECUs 12 and 16 connected to the low-speed in-car network 10 via the low-speed in-car network 10 according to the instruction from the control unit 1101.

The high-speed in-car LAN I/F 1107 performs transmission and reception of data to and from the ECU3 18, which is connected to the high-speed in-car network 17, via the high-speed in-car network 17 according to the instruction from the control unit 1101.

FIG. 2(b) is a block diagram illustrating a configuration of the control program that is operated on the software updating apparatus 11.

A control program 11010 that realizes functions of the software updating apparatus 11 is developed in the memory unit 1102 of the software updating apparatus 11 and is executed by the control unit 1101. FIG. 2(b) is functionally divided and illustrated in blocks and division and integration of each of the blocks are possible. In addition, it is not necessary to realize the control program by one program and the control program may be realized in combination with two or more programs.

The control program 11010 is configured with an update control unit 11011, an external communication control unit 11012, an in-car communication control unit 11013, and a high-speed in-car communication control unit 11014.

The update control unit 11011 acquires the update information 5 from the server 2 via the external communication control unit 11012 or transmits a state of the vehicle and a situation of software update processing to the server 2. In addition, the update control unit 11011 acquires the update information 5 and states of other configuration elements in the car via the in-car communication control unit 11013 and implements software update processing according to the acquired states of other configuration elements. Furthermore, the update control unit 11011 performs application processing in which a program included in the update information 5 is applied to an ECU designated by a system designated in the update information 5.

The external communication control unit 11012 operates the WAN I/F 1105 in accordance with instruction from the update control unit 11011 and performs transmission and reception of data to and from the server 2 via the access network 4 and the Internet 3. In addition, the external communication control unit 11012 has a function of analyzing and configuring a packet including the TCP/IP and the UDP/IP.

The in-car communication control unit 11013 operates the low-speed in-car LAN I/F 1106 in accordance with the instruction from the update control unit 11011 and performs transmission and reception of data to and from other devices connected to the in-car network via the low-speed in-car network 10.

The high-speed in-car communication control unit 11014 operates the high-speed in-car LAN I/F 1107 in accordance with the instruction from the update control unit 11011 and performs transmission and reception of data to and from other devices connected to the in-car network via the high-speed in-car network 17.

FIG. 3(*a*) is a block diagram illustrating a hardware configuration example of the ECU1 12.

The ECU1 12 is configured with a control unit 1201, the memory unit 1102, and the low-speed in-car LAN I/F 1106 and is connected to a sensor 1202 and an actuator 1203.

The control unit 1201 executes the control program and operates the ECU1 12 to realize a part of necessary functions of the automobile by performing reading of the sensor 1202 and operation of the actuator 1203 and performing transmission and reception of data to and from other devices, which are connected over the low-speed in-car network 10, via the low-speed in-car LAN I/F 1106.

The sensor 1202 acquires data necessary for controlling the automobile according to instruction from the control unit 1201.

The actuator 1203 drives configuration elements, including a brake, according to instruction from the control unit 1201.

The functions of other configuration elements will not be described since the functions are the same as those of the software updating apparatus 11.

FIG. 3(*b*) is a block diagram illustrating a configuration of a control program that is operated on the ECU1 12.

A control program 12010 that realizes functions of the ECU1 12 is developed on the memory unit 1102 of the ECU1 12 and is executed by the control unit 1201. FIG. 3(*b*) is functionally divided and illustrated in blocks and division and integration of each of the blocks are possible. In addition, it is not necessary to realize the control program by one program and the control program may be realized in combination with two or more programs.

The control program 12010 is configured with a control processing unit 12011, an updating unit 12012, and the in-car communication control unit 11013.

The control processing unit 12011 reads from the sensor 1202 and operates the ECU1 12 to realize a part of necessary functions of the automobile by performing operation of the actuator 1203 and transmission and reception of data to and from other devices, which are connected over the low-speed in-car network 10, via the low-speed in-car LAN I/F 1106.

The updating unit 12012 is configured with a receiving unit 120121, a writing unit 120122, a difference restoration unit 120123, and a compression and decompression unit 120124. The receiving unit 120121 receives control instruction and update data from the software updating apparatus 11 via the in-car communication control unit 11013. The writing unit 120122 writes a program in the nonvolatile memory of the memory unit 1102. The difference restoration unit 120123 restores a new program from the update data (difference data) received by the receiving unit 120121 and the program before updating, which is developed in the memory unit 1102. The compression and decompression unit 120124 decompresses the update data (compressed data) received by the receiving unit 120121.

By causing the above configuration elements to cooperate with each other, the updating unit 12012 rewrites the control program of the memory unit 1102 of the ECU1 12 in accordance with an update control request received from the software updating apparatus 11 via the in-car communication control unit 11013 and applies update of the program to the ECU1 12.

The in-car communication control unit 11013 operates the low-speed in-car LAN I/F 1106 in accordance with instruction from the update control unit 11011 and performs transmission and reception of data to and from other devices, which are connected to the in-car network, via the low-speed in-car network 10.

The functions of other configuration elements will not be described since the functions are the same as those of the control program 11010 of the software updating apparatus 11.

FIG. 4 is a block diagram illustrating a configuration of a control program that is operated on the ECU2 16.

A control program 16010 is configured with the control processing unit 12011, an updating unit 16011, and the in-car communication control unit 11013.

The updating unit 16011 is configured with the receiving unit 120121 and the writing unit 120122. The updating unit 16011 of the control program 16010 of the ECU2 16 cannot restore differences and cannot compress or decompress since the updating unit 16011 does not have the difference restoration unit 120123 or the compression and decompression unit 120124 that the updating unit 12012 of the control program 12010 of the ECU1 12 has.

The functions of other configuration elements will not be described since the functions are the same as those of the control program 12010 of the ECU1 12.

The hardware configuration of the ECU2 16 is the same as that of the ECU1 12.

FIG. 14(*a*) is a block diagram illustrating a hardware configuration example of the ECU3 18.

The ECU3 18 is configured with the control unit 1201, the memory unit 1102, and the high-speed in-car LAN I/F 1107 and is connected to the sensor 1202 and the actuator 1203.

The function of each element will not be described since the function is the same as that of a functional element corresponding to other apparatuses.

FIG. 14(b) is a block diagram illustrating a configuration of a control program that is operated on the ECU3 18.

A control program 18010 is configured with the control processing unit 12011, the updating unit 12012, and the high-speed in-car communication control unit 11014.

The function of each configuration element will not be described since the function thereof is the same as that of a configuration element corresponding to other apparatuses.

FIG. 5 is a sequence diagram illustrating flow of entire update processing.

Initially, at a time of starting an engine, the software updating apparatus 11 downloads information to be updated from the server 2 and keeps the information in the memory unit 1102 of the software updating apparatus 11 (S100). After then, when an engine state transitions from starting to a stop, preprocessing S200 is implemented and then application processing is performed onto individual ECUs (herein, the ECU1 is given as an example) (S300). Lastly, postprocessing S400 is implemented and the update processing is completed. A start timing of update processing (preprocessing S200, application processing S300, and postprocessing S400) may be immediately after the completion of download processing S2100 or a predetermined time in addition to a time of engine stop.

FIG. 6 is a configuration example of the update information 5 acquired by the software updating apparatus 11 from the server 2.

The update information 5 is configured with a header portion D1000, preprocessing information D2000, control apparatus update information D3000, and postprocessing information D4000.

The header portion D1000 is configured with a vehicle ID (D1001), which is information for uniquely identifying a vehicle, which is an update target, and an update ID (D1002) for uniquely identifying the update.

As in the above description, since the header portion D1000 includes the vehicle ID D1001 which can be compared with the IDs of vehicles that the vehicles keep, the vehicle to which update is to be applied can be confirmed without a mistake. In addition, unique identification of content of update can be carried out easier by the update ID D1002 being included. For example, it is possible to quickly grasp which type of update is to be performed, by using the update ID D1002 as an index in management information that is separately managed.

The preprocessing information D2000 is a region where information necessary for preprocessing, which is commonly implemented beforehand on each ECU in updating the program of the ECU, is stored. In this example, the preprocessing information D2000 is configured with user approval necessity D2001, in which whether or not user approval is necessary in updating the program of the ECU is identified, and an update processing start timing D2002.

The control apparatus update information D3000 is a region where update information is stored for each ECU to be an update target. In this example, a case where the ECU1 and the ECU2 are update targets is given as an example and the control apparatus update information D3000 is configured with update information D3100 of ECU1 and update information D3200 of ECU2.

The postprocessing information D4000 is a region where information necessary for implementing postprocessing after updating in updating the program of the ECU is stored.

In this example, the postprocessing information D4000 is configured of user notification necessity D4001.

As in the above description, the software updating apparatus 11 can appropriately execute necessary processing prior to applying update and necessary processing after applying update in software update processing by the update information 5 including preprocessing information and postprocessing information.

In this example, since the user approval necessity D2001 is included in the preprocessing information D2000, switching can be flexibly performed between processing in a case where approval from the user is not necessary immediately before updating, including a case where approval from the user is obtained in advance with another means and a case where update of the program is intended to be automatically applied to a car before sale, and processing in a case where user confirmation is intended to be obtained in the vehicle. In addition, since the user notification necessity D4001 is included in the postprocessing information D4000, whether or not to perform notification to the user at a time of applying update can be controlled after updating, as in preprocessing. Furthermore, since the update processing start timing D2002 is included, various start timings in accordance with update content and characteristics (updatable during travelling as well) of an ECU to be updated, including "immediately after download processing completion", "when an engine state is transitioned from a state of starting to a state of stop", "designated date and time", and "discretion (user operation)", can be flexibly controlled on a server side.

FIG. 7 is a configuration example of the control apparatus update information D3000.

The ECU1 update information D3100 and the ECU2 update information D3200 are configured with ECU IDs D3101 and D3201, software versions D3102 and D3202, preprocessing information D3110 and D3210, application processing information D3120 and D3220, postprocessing information D3130 and D3230, and sums D3104 and D3204, respectively.

The ECU IDs D3101 and D3201 are identification information for uniquely identifying an ECU, and in this example, 1 (D3101) is set for the ECU1 12 and 2 (D3201) is set for the ECU2 16. As in the above description, by update information including ECU IDs, an ECU, which is an update target, can be uniquely identified.

The software versions D3102 and D3202 are version numbers of programs currently installed in the ECUs, and in this example, 1.0 (D3102) is set for the ECU1 12 and 1.1 (D3202) is set for the ECU2 16. As in the above description, by update information including program versions, programs, which are update targets, can be identified without a mistake and a defect including applying a difference to the wrong version at a time of difference update can be prevented.

The preprocessing information D3110 and D3210 are regions where information necessary for update preprocessing peculiar to the ECUs is stored and power consumption (D3111 and D3211) necessary for update, update time (D3112 and D3212) which takes for updating, error check necessity (D3113 and D3213), authentication necessity (D3114 and D3214), and learning value withdrawal information (D3115 and D3215) are stored. In this example, the power consumption D3111 of the ECU1 12 is set to 0.1 Wh, the update time D3112 is set to 20 sec, the error check necessity D3113 is set to "check required", the authentication necessity D3114 is set to "authentication required", the learning value withdrawal information D3115 is set to "learning value withdrawal required" and a read address "0xAA", the power consumption D3211 of the ECU2 16 is set to 0.2 Wh, the update time D3212 is set to 60 sec, the error check necessity D3213 is set to "check not required", the authentication necessity D3214 is set to "authentication not required", and the learning value withdrawal information D3215 is set to "learning value withdrawal not required". As in the above description, preprocessing different for each ECU can be appropriately set by preprocessing information being included in update information for each ECU. For example, since power consumption and time for update are different for each ECU as described in this example, more appropriate update processing can be performed due to individual setting. In addition, in accordance with update content, error check necessity can be changed or withdrawing learning value can be changed.

The application processing information D3120 and D3220 are regions where information necessary for applying new programs to the ECUs is stored.

The application processing information D3120 is configured with an application system ID1 D3121, a block number D3122, an application system ID2 D3123, and update data D3124. The same applies to the application processing information D3220.

The application system ID1 D3121 and an application system ID1 D3221 are regions where systems of applying update are set and any one of "normal", "difference", "compression", and "designation for each block" is set. "Normal" indicates applying update data through full update systems and indicates a system in which the update data itself is transmitted to the ECU and the ECU writes the received data as it is in a memory unit. "Difference" indicates applying update data through a difference update system and indicates a system in which difference data acquired from data before updating and data after updating is transmitted to the ECU and the ECU restores the data after updating from the received difference data and the data before updating that exists in the memory unit 1102 of the ECU to write the restored data in the memory unit. "Compression" indicates applying update data through a compression update system and indicates a system in which data obtained by compressing the data after updating is transmitted to the ECU and the ECU decompresses the received compressed data and then writes the decompressed data in the memory unit. "Designation for each block" indicates that the above "normal", "difference", and "compression" are designated for each logical block of the nonvolatile memory of the memory unit 1102 of the ECU, in an application system ID2 which will be described later.

The block number D3122 and block numbers D3125, D3222 and D3224 are set to have the number of a logical block of the nonvolatile memory of the memory unit 1102 of the ECU to be an update target.

The application system ID2 D3123 and an application system ID2 D3126 are regions where systems of applying update with respect to blocks designated by block numbers are set and any one of "normal", "difference", and "compression" is set. The application system ID2 is not set in a case where "designation for each block" is set in the application system ID1.

The update data D3124 and update data D3127, D3223, and D3225 are regions where data necessary for applying data after updating to the ECU is stored and a writing destination address information and the data after updating itself are stored in a case where the application system is "normal", a writing destination address information and difference data acquired from data before updating and the data after updating is stored in a case where the application system is "difference", or a writing destination address information and data obtained by compressing the data after updating is stored in a case where the application system is "compression".

In this example, in the ECU1 update information D3100, "designation for each block" is set in the application system ID1 D3121 and an application system is designated for each block, which is an update target. As an update target of the ECU1, the number 3 is designated in the block number D3122, the update system of the block is set to a "difference" update system in the application system ID2 D3123, and the update data is stored in D3124. Furthermore, the block number 8 is designated as the update target in the block number D3125, a "compression" update system is designated as the application system of the block is designated in the application system ID2 D3126, and the update data is stored in D3127. In addition, in the ECU2 update information D3200, "normal" is set in the application system ID1 D3221 and using a normal update system with respect to all blocks which are update targets is designated. The number 8 is designated as an update target of the ECU2 in the block number D3222 and update data with respect to the block is stored in D3223. The block number 64 is designated as an update target in the block number D3224 and update data with respect to the block is stored in D3225.

As described hereinbefore, by including an application system indicating how a program after updating is applied to ECU update information for each ECU, a processing system that varies depending on the timing of update or update content can be designated with respect to the same ECU and which type of system is to be used with respect to which type of ECU at a time of application can be flexibly designated. Furthermore, by designating an application system for each update block, update processing with high efficiency is possible such as changing an application system for each block according to conditions including a generated difference data size and memory resources of the ECU.

The postprocessing information D3130 and D3230 are regions where information necessary for update postprocessing peculiar to the ECUs is stored and resetability D3131 and D3231 indicating whether or not the ECUs may be reset immediately after update application are stored. In this example, both of the resetability D3131 of the ECU1 and the resetability D3231 of the ECU2 are set to "impossible". As in the above description, by update information for each ECU including postprocessing information, postprocessing different for each ECU can be set. For example, as described in this example, in a case where information indicating resetability immediately after updating is added and there is a dependent relationship with update of other ECU, it is possible to control such that reset is performed after all ECUs having a dependent relationship are updated instead of performing reset immediately after.

The sums D3104 and D3204 are checksums for detecting whether or not the update information D3100 and D3200 are wrong. By giving a sum for each ECU update information, instead of a sum for the entire update information, the fact that received ECU update information is correct can be confirmed even when the update information is received through streaming and each ECU update information is developed in a region of a memory corresponding to each ECU.

FIG. 8 is a sequence diagram illustrating flow of the preprocessing S200 in the update processing.

FIG. 8(a) is a sequence diagram illustrating flow of preprocessing related to the entire vehicle.

The update control unit 11011 of the software updating apparatus 11 confirms that whether or not the initially received vehicle ID D1001 matches a vehicle ID to be managed (S201). In a case where the vehicle ID D1001 does not match the vehicle ID to be managed (NO in S201), processing is ceased without implementing subsequent processing (S217). In a case where the vehicle ID D1001 matches the vehicle ID (YES in S201), next, network IDs necessary for being connected to the ECUs, which are update targets, via the network are acquired from the ECU IDs D3101 and D3201 (S202) and program versions installed in the ECUs are acquired by using the acquired IDs (S203). The update control unit 11011 confirms whether or not the program versions acquired within the vehicle match the software versions D3102 and D3202 received from the server (S204) and in a case where the program versions do not match the software versions D3102 and D3202 (NO in S204), processing is ceased without implementing subsequent processing (S217). In a case where the program versions match the software versions D3102 and D3202 (YES in S204), next, it is confirmed whether or not approval from the user is necessary in updating, from the user approval necessity D2001 (S205). In a case where the approval is not necessary (NO in S205), processing proceeds to the next vehicle state check S211. In a case where the approval is necessary (YES in S205), time (update time) necessary for update processing is calculated by adding the update time D3112 and D3212 included in download information together (S206) and a user confirmation request, including the update ID D1002 and the update time that are calculated in the HMI 13, is transmitted via the in-car communication control unit 11013 (S207). The HMI 13 configures G100 of FIG. 13 from the received update ID D1002 and the update time and displays whether or not the user approves execution of update processing for confirmation (S208). Next, results of user operation are transmitted as a reply to the user confirmation request S207 (S209). Once the update control unit 11011 of the software updating apparatus 11 receives the reply via the in-car communication control unit 11013, update approval from the user included in the reply is confirmed (S210). In a case where update is rejected (NO in S210), processing is ceased without implementing subsequent processing (S217). In a case where update is approved (YES in S210), a variety of states of a vehicle to be confirmed before starting update are acquired (S211) and it is confirmed whether or not update may be started (S212). In a case where it is determined to be a startable state (OK in S212), a start notification is transmitted to the server 2 via the external communication control unit 11012 (S216). On the other hand, in a case where it is determined to be a state in which update start is impossible (NG in S212), a request for displaying a reason for impossible start is transmitted to the HMI 13 via the in-car communication control unit 11013 (S213) and the HMI 13 configures and displays a screen of G200 of FIG. 13 based on the received request for displaying a reason for impossible start (S214). After displaying the reason, the HMI 13 transmits a reply to the software updating apparatus 11 (S215) and once the update control unit 11011 of the software updating apparatus 11 receives the reply via the in-car communication control unit 11013, processing is ceased (S217).

As described hereinbefore, by the header portion D1000 including the vehicle ID D1001 and the vehicle ID D1001 being comparing with the ID of the vehicle that the vehicle keeps, the vehicle to which update is applied can be confirmed without a mistake.

In addition, by update information including a program version and the program version being compared with version information acquired from the ECU, a defect, including recognizing a program, which is an update target, without a mistake but applying a difference to the wrong version at a time of difference update, can be prevented.

Furthermore, since the user approval necessity D2001 is included and determination as to whether or not to display a user approval screen can be made based on this inclusion, switching can be flexibly performed between processing in a case where approval from the user is not necessary immediately before updating, including a case where approval from user is obtained in advance with another means and a case where update of the program is intended to be automatically applied to the car before sale, and processing in a case where user confirmation is intended to be obtained in the vehicle.

In addition, in a case where approval is obtained from the user, the user can appropriately determine whether or not to start update processing by time required for update, which is calculated from the update time included in the update information, being transmitted as well to the HMI and the time required for update being displayed by the HMI.

Furthermore, if the received update ID is transmitted to the HMI and the update ID and detailed content based on the update ID are separately acquired and displayed by the HMI, the user can appropriately determine whether or not to start update processing.

In a case where update processing cannot be started as a result of the vehicle state check, the user can appropriately grasp the state of the vehicle and obtain information for transitioning the state of the vehicle to a state where software update is possible by the content that the processing cannot be started being presented to the user.

FIG. 8(*b*) is a sequence diagram illustrating flow of preprocessing with respect to the ECU (ECU1), which is an update target.

The update control unit 11011 of the software updating apparatus 11 performs update preprocessing with the ECU1 based on the preprocessing information D3110 (FIG. 7) within the ECU1 update information D3100 included in the update information 5 of FIG. 6.

The update control unit 11011 of the software updating apparatus 11 initially reads the error check necessity D3113 and determines whether or not an error check is necessary (S220). In a case where an error check is not required (NO in S220), processing proceeds to the next step without performing the error check. In a case where an error check is necessary (YES in S220), a Diagnostic Trouble Code (DTC) reading request is transmitted to the ECU1 (S221). Once a reply is received via the in-car communication control unit 11013 (S222), the update control unit 11011 of the software updating apparatus 11 confirms content of the DTC included in the reply, determines whether or not an abnormality has occurred in the ECU1 (S223), and performs abnormality termination processing, instead of performing the subsequent processing, in a case where it is determined that an abnormality has occurred (NG in S223). In the abnormality termination processing, the update control unit 11011 transmits an abnormality display request to the HMI 13 via the in-car communication control unit 11013 (S235) and the HMI 13 configures and displays a screen based on the received request (S236). After displaying the screen, the HMI 13 transmits a reply to the software updating apparatus 11 (S237) and the update control unit 11011 of the software updating apparatus 11 transmits an abnormality notification to the server 2 and then ceases processing (S217) once the reply is received via the in-car communication control unit 11013 (S238). In a case where it is determined that the ECU1 is normal (OK in S223), the update control unit 11011 reads the authentication necessity D3114 and determines whether or not authentication processing with the ECU1 is necessary (S224). In a case where authentication is not required (NO in S224), processing proceeds to the next step without performing the authentication processing. In a case where authentication is necessary (YES in S224), an authentication request is transmitted to the ECU1 (S225). Once a reply is received via the in-car communication control unit 11013 (S226), the update control unit 11011 of the software updating apparatus 11 generates a response from information included in the reply (S227) and transmits the response to the ECU1 via the in-car communication control unit 11013 (S228). Once a result reply is received via the in-car communication control unit 11013 (S229), the update control unit 11011 of the software updating apparatus 11 determines whether or not authentication has succeeded (S230) and performs abnormality termination processing without performing the subsequent processing in a case where authentication is determined to be failed (NG in S230). In a case where authentication with the ECU1 is determined to be succeeded (OK in S230), the update control unit 11011 reads the learning value withdrawal information D3115 and determines whether or not learning value withdrawal with the ECU1 is necessary (S231). In a case where learning value withdrawal is not required (NO in S231), processing proceeds to the next step without performing learning value withdrawal processing. In a case where learning value withdrawal is necessary (YES in S231), a data acquiring request is transmitted to the ECU1 based on information included in learning value withdrawal information D3115 (S232). Once a reply is received via the in-car communication control unit 11013 (S233), the update control unit 11011 saves a learning value included in the reply in the memory unit 1102 of the software updating apparatus 11 (S234). As in the above description, by update information including error check necessity, authentication necessity, and learning value withdrawal information and preprocessing being implemented based on the information, a sequence can be configured such that necessary and sufficient processing only is flexibly implemented, such as error check necessity is changed in accordance with the update content and a withdrawing learning value is changed.

FIG. 9(a) is a sequence diagram of network ID acquisition processing S202.

The update control unit 11011 of the software updating apparatus 11 designates ECU ID=1 and transmits an ID acquisition request to the low-speed in-car network 10 via the in-car communication control unit 11013 (S2021). Once the ID acquisition request, in which ECU ID=1 is designated, is received, the ECU1 returns a reply, in which the network ID of the ECU1 is set, to the software updating apparatus 11 (S2022).

Next, the update control unit 11011 of the software updating apparatus 11 designates ECU ID=2 and transmits an ID acquisition request to the low-speed in-car network 10 via the in-car communication control unit 11013 (S2023). Once the ID acquisition request, in which ECU ID=2 is designated, is received, the ECU2 returns a reply, in which the network ID of the ECU2 is set, to the software updating apparatus 11 (S2024).

As in the above description, by acquiring the ID on the network of the corresponding ECU based on the ECU ID, the software updating apparatus 11 can appropriately communicate with the ECU connected through the in-car network.

FIG. 9(b) is a sequence diagram of software version acquisition processing S203.

The update control unit 11011 of the software updating apparatus 11 transmits a version acquisition request to the ECU1 via the in-car communication control unit 11013 (S2031). Once the version acquisition request is received, the ECU1 returns a reply, in which the software version of the ECU1 is set, to the software updating apparatus 11 (S2032).

Next, the update control unit 11011 of the software updating apparatus 11 transmits a version acquisition request to the ECU2 via the in-car communication control unit 11013 (S2033). Once the version acquisition request is received, the ECU2 returns a reply, in which the software version of the ECU2 is set, to the software updating apparatus 11 (S2034).

As in the above description, by acquiring a program version from the ECU and the program version being compared with a software version included in update information, a detect, including recognizing a program, which is an update target, without a mistake but applying a difference to the wrong version at a time of difference update, can be prevented.

FIG. 9(c) is a sequence diagram of vehicle state acquisition processing S211.

The update control unit 11011 of the software updating apparatus 11 calculates (S2111) power consumption of update processing by adding power consumption D3111 and D3211 included in the update information 5 together. Next, the update control unit 11011 transmits a battery level acquisition request to the power source management ECU 14 via the in-car communication control unit 11013 (S2112). Once the battery level acquisition request is received, the power source management ECU 14 transmits a reply including the battery level of the storage battery (S2113). Once the battery level acquisition reply is received, the update control unit 11011 of the software updating apparatus 11 compares a value obtained by subtracting power consumption calculated beforehand from the battery level included in the received reply with a predetermined value d (for example, a value obtained by adding a margin to the amount of power necessary for staring an engine, such as 1 Wh) (S2114). It is determined to be a state where update cannot be started in a case where the value obtained by subtracting power consumption from the battery level is equal to or lower than the predetermined value d, it is determined to be a state where update can be started in a case where the value obtained by subtracting power consumption from the battery level is larger than the predetermined value d, and this result is used in start determination S212 for the update of FIG. 8.

As in the above description, by comparing the battery level acquired from the power source management ECU with the power consumption obtained by adding power consumption included in the update information for each ECU together and by executing update processing based on the result of comparison, a defect of discontinuing power supply during updating treatment of the ECU can be prevented.

FIG. 10 is a sequence diagram illustrating flow of application processing S300 in update processing.

The update control unit 11011 of the software updating apparatus 11 confirms an update system to be applied to the ECU from the application system ID1 (D3121 or D3221) included in the update information 5 received from the server (S301).

Hereinafter, a case where the update system ID1 (D3221) indicates other than "designation for each block" (other than "designation for each block" in S301) will be described with the update information D3220 of the ECU2 16 given as an example.

In a case where the update system ID1 (D3221) indicates other than "designation for each block", the update control unit 11011 determines that common application processing is to be performed on all blocks with respect to the ECU2, confirms the application system designated in the update system ID1 (D3221) (S302), and starts processing on the block number 8 set in an initial application block number D3222 included in the ECU2 update information D3200. In a case where the application system ID2 D3123 indicates full update ("normal" in S302), full update application processing S310 is applied to the block. In a case where the application system. ID2 D3123 indicates compression update ("compression" in S302), compression update application processing S320 is applied to the block. In a case where the application system ID2 D3123 indicates difference update ("difference" in S302), difference update application processing S330 is applied to the block. Once processing of the block, which is an initial processing target, is completed, the absence and presence of the next processing target block is confirmed (S303) and in a case where the next processing target block is present (YES in S303), the next block number is read and full update application processing is implemented on the set block. After then, application processing is performed on all of processing target blocks. In a case where the next processing target block is absent (NO in S303), processing proceeds to confirm the absence and presence of the next processing target ECU (S306).

Next, a case where the update system ID1 (D3121) indicates "designation for each block" ("designation for each block" of S301) will be described with the application processing information D3120 of the ECU1 12 given as an example.

In a case where update system ID1 (D3121) indicates "designation for each block", the update control unit 11011 determines that an update system is designated for each block with respect to the ECU1 and starts processing on the block number 3 set in the initial application block number D3122 of the ECU1. The update control unit 11011 initially confirms the application system ID2 D3123 indicating an application system with respect to the block (S304). In a case where the application system ID2 D3123 indicates full update ("normal" in S304), the full update application processing S310 is applied to the block. In a case where the application system ID2 D3123 indicates compression update ("compression" in S304), the compression update application processing S320 is applied to the block. In a case where the application system. ID2 D3123 indicates difference update ("difference" in S304), the difference update application processing S330 is applied to the block. Once processing of the block, which is an initial processing target, is completed, the absence and presence of the next processing target block is confirmed (S305) and in a case where the next processing target block is present (YES in S305), the next block number is read and processing from application system ID2 confirmation S304 to confirmation of the absence and presence of processing target block S305 is implemented on the set block. After then, this processing is repeated with respect to all of processing target blocks. In a case where the next processing target block is absent (NO in S305), processing proceeds to confirmation of the absence and presence of the next processing target ECU (S306).

Once the application processing of the processing target ECU is completed, the absence and presence of the next processing target ECU is confirmed (S306). In a case where the next processing target ECU is present (YES in S306), processing returns to the beginning and processing of the ECU is started. In a case where the next processing target ECU is absent (NO in S306), the application processing is terminated.

As described hereinbefore, by selecting an application system to be executed according to the application system included in the received update information and executing the application processing, determination as to which type of system is to be used with respect to which type of ECU, including designating a processing system that varies depending on the timing of update or update content with respect to the same ECU, can be made at a time of application. Furthermore, by selecting an application system to be executed according to the application system designated for each update block as the application system and executing application processing, update processing with high efficiency is possible, such as changing an application system for each block under conditions, such as a generated difference data size and memory resources of the ECU.

FIG. 11(*a*) is a sequence diagram of the full update application processing S310 implemented between the software updating apparatus 11 and the ECU.

Initially, the update control unit 11011 of the software updating apparatus 11 designates a block number with respect to the ECU and issues an erasing request via the in-car communication control unit 11013 (S311). The updating unit 12012 of the ECU2 16 which has received the erasing request via the in-car communication control unit 11013 erases the region of the nonvolatile memory of the memory unit 1102 of the ECU1 (S312) and transmits a normal reply to the software updating apparatus 11 via the in-car communication control unit 11013 (S313). The update control unit 11011 which has received the normal reply from the ECU1 transmits a data transmission and writing request that includes a writing destination address and data to be written in the memory unit of the ECU to the ECU1 via the in-car communication control unit 11013 (S314). The updating unit 12012 of the ECU1 which has received the data transmission and writing request writes the received data at the designated writing destination address of the nonvolatile memory of the memory unit 1102 (S315) and transmits a normal reply to the software updating apparatus 11 via the in-car communication control unit 11013 in a case where writing has succeeded (S316).

FIG. 11(*b*) is a sequence diagram of the compression update application processing S320 implemented between the software updating apparatus 11 and the ECU.

Initially, the update control unit 11011 of the software updating apparatus 11 designates a block number with respect to the ECU and issues an erasing request via the in-car communication control unit 11013 (S321). The updating unit 12012 of the ECU1 12 which has received the erasing request via the in-car communication control unit 11013 erases the region of the nonvolatile memory of the memory unit 1102 of the ECU1 (S322) and transmits a normal reply to the software updating apparatus 11 via an in-car communication control unit 11013 (S323). The update control unit 11011 which has received the normal reply from the ECU1 transmits a data transmission, decompression, and writing request that includes a writing destination address and data to be written in the memory unit of the ECU to the ECU1 via the in-car communication control unit 11013 (S324). The updating unit 12012 of the ECU1 which has received the data transmission, decompression, and writing request decompresses the received compressed data (S325), then writes the received data to the designated writing destination address of the nonvolatile memory of the memory unit 1102 (S326), and transmits a normal reply to the software updating apparatus 11 via the in-car communication control unit 11013 in a case where writing has succeeded (S327).

FIG. 11(*c*) is a sequence diagram of the difference update application processing S330 implemented between the software updating apparatus 11 and the ECU.

Initially, the update control unit 11011 of the software updating apparatus 11 transmits a data transmission and restoration request that includes difference data read from the ECU1 update information D3100 stored in the memory unit 1102 to the ECU1 via the in-car communication control unit 11013 (S331). The updating unit 12012 of the ECU1 which has received the data transmission and restoration request restores data after updating using the received difference data and the current program or data stored in the nonvolatile memory of the memory unit 1102 to store the restored data in the volatile memory (S332) and transmits a normal reply to the software updating apparatus 11 via the in-car communication control unit 11013 (S333). The update control unit 11011 which has received the normal reply from the ECU1 designates a block number with respect to the ECU1 and issues an erasing request (S334). The updating unit 12012 of the ECU which has received the erasing request via the in-car communication control unit 11013 erases the region of the nonvolatile memory of the memory unit 1102 of the ECU1 (S335) and transmits a normal reply to the software updating apparatus 11 via the in-car communication control unit 11013 (S336). The update control unit 11011 of the software updating apparatus 11 which has received the normal reply from the ECU1 transmits a writing request (including a block number of a writing destination) to the ECU1 via the in-car communication control unit 11013 (S337). The updating unit 12012 of the ECU1 which has received the writing request writes the update data after restoration, which is stored in the volatile memory of the memory unit 1102, in the nonvolatile memory of the memory unit 1102 (S338) and transmits a normal reply to the software updating apparatus 11 via the in-car communication control unit 11013 in a case where writing has succeeded (S339).

Hereinbefore, in a data transmission request (data transmission and writing request/data transmission, decompression, and writing request/data transmission and restoration request) in the processing of FIG. 11, update data is divided into an appropriate unit according to the bandwidth of the in-car network and then transmitted.

FIG. 12 is a sequence diagram illustrating flow of the postprocessing S400 in update processing.

Initially, the update control unit 11011 of the software updating apparatus 11 confirms update states of the ECUs, which are update targets (S401). In a case where anyone of the ECUs, which are the update targets, is not updated (NO in S401), the update control unit 11011 again implements confirmation after standing by for a predetermined length of time (for example, 100 msec). In a case where all of the ECUs, which are the update targets, are updated (YES in S401), a reset request is transmitted to the ECUs, which are the update targets (S402 and S403). Once the reset request from the software updating apparatus 11 is received, the ECU1 and the ECU2 transmit a normal reply (S404 and S405) and perform reset processing (S406 and S407). The software updating apparatus 11 transmits an update completion notification to the server (S408). Next, the user notification necessity D4001 included in the postprocessing information D4000 is confirmed (S409). In a case where a user notification is necessary (YES in S409), a completion notification request is transmitted to the HMI 13 (S410). Once the completion notification request is received, the HMI 13 configures and displays a screen G300 (S411) and transmits a reply to the software updating apparatus 11 (S412). In a case where a user notification is not necessary (NO in S409), processing is terminated.

FIG. 13 is an example of a screen of the HMI 13.

G100 is an example of a screen that is presented to inquire of the user about software update startability. The screen G100 is configured with an update ID G101, time required for update G102, an update approval button G103, and an update holding button G104.

As in the above description, the user can appropriately determine whether or not to start update processing by the HMI displaying the time required for update received from the software updating apparatus 11. In addition, if the update ID received from the software updating apparatus 11 or detailed content acquired based on the update ID is displayed, the user can appropriately determine whether or not to start update processing.

G200 is an example of a screen that presents a reason for not starting software update and a solution in a case of a state where the vehicle cannot start software update. The screen G200 is configured with an update cessation reason G201 and a confirmation button G202. Herein, "Update cannot be started due to a low battery level. Please try again after travelling." is displayed as a reason for update cessation. As in the above description, by presenting content of update cessation to the user in a case where update cannot be started and update is ceased, the user can appropriately grasp a state of the vehicle and obtain information for transitioning the state of vehicle to a state where software update is possible.

G300 is an example of a screen to notify the user of completion of processing in a case where software update of the vehicle is completed. The screen G300 is configured with the update ID G101 and the confirmation button G302.

Example 2

In the aforementioned Example 1, a method for inquiring of a device connected on the in-car network and acquiring a network ID for communicating with the device by means of an ECU ID included in ECU update information has been described. In addition, a transmission timing of data has not been particularly mentioned. In this example, a case where ECU update information includes connection information will be described.

FIG. 15 is a configuration example of ECU update information including information for being connected to a device on the in-car network.

D3100 is ECU1 update information and D5100 is ECU3 update information. The ECU update information of this example is configured with domains D3105 and D5105, Net IDs D3106 and D5106, and bandwidths D3107 and D5107 in addition to the ECU update information of Example 1.

The domains D3105 and D5105 are identification information to identify a network domain to which the ECU is connected and are set to a low-speed in-car LAN (D3105) in a case of the ECU1 12 and to a high-speed in-car LAN (D5105) in a case of the ECU3 18.

The Net IDs D3106 and D5106 are identification information for identifying an ECU on the network and are set to A (D3106) in a case of the ECU1 12 and to B (D5106) in a case of the ECU3 18.

As described hereinbefore, by the update information 5 including information necessary for network connection for each ECU, processing can be simplified or speeded up as processing of inquiring of a device within the car and acquiring network connection information is omitted, or setup related to the software updating apparatus 11 necessary for update preprocessing can be simplified as the software updating apparatus 11 may not keep a table in which the ECU ID and the network connection information are correlated with each other.

The bandwidths D3107 and D5107 indicate network bandwidths that are usable for updating the ECUs and are set to 100 kbps (D3107) in a case of the ECU1 12 and to 10 Mbps (D5107) in a case of the ECU3 18. The software updating apparatus 11 controls a data transmission timing such that a set bandwidth is not exceeded at a time of update data transmission, using this bandwidth information.

As described hereinbefore, by a network bandwidth that is usable in updating the ECU being set in update information for each ECU and the software updating apparatus 11 executing update processing in accordance with the information, speeding-up of update processing can be achieved to an extent of not affecting other apparatuses.

Example 3

In the aforementioned Example 1, a method for determining whether or not to start update processing by means of power consumption set in ECU update information has been described. In this example, update processing start conditions other than the above conditions will be described with preprocessing information of ECU update information of the ECU1 given as an example.

FIG. 16(a) is a configuration example of the preprocessing information D3110 of the ECU1 update information D3100 in this example.

The preprocessing information D3110 is configured with updatability during travelling D31131, an IGN state D31132, an engine state D31133, a steering lock state D31134, a gear state D31135, a brake state D31136, a door lock state D31137, and a charge state D31138.

The updatability during travelling D31131 is identification information indicating whether or not a program of the ECU may be updated during travelling and any one of "YES" and "NO" may be set. A case of "YES" refers to a case where the ECU is updatable during travelling and a case of "NO" refers to a case where the ECU cannot be updated during travelling. As in the above description, by update information for each ECU including identification information as to whether or not to approve update during travelling, efficient update processing is possible, such as implementing software update of the ECU, which does not affect travelling during travelling.

The IGN state D31132 is identification information indicating a state of ignition (IGN) in which program update of the ECU is startable and is set to any one of "ON", "accessories (ACC)", and "OFF". For example, in a case where the IGN state D31132 is set to "OFF", update is not executed in a case where the IGN state of the vehicle acquired by the update control unit 11011 of the software updating apparatus 11 is other than "OFF". As in the above description, by update information for each ECU including an IGN state in which update processing is startable, starting software update processing of the ECU in an appropriate power supply state is possible.

The engine state D31133 is identification information indicating an engine state in which program update of the ECU is startable and is set to any one of "stop", "ON", and "- (Don't Care)". For example, in a case where the engine state D31133 is set to "stop", update is not executed in a case where an engine state of the vehicle acquired by the update control unit 11011 of the software updating apparatus 11 is other than "stop". As in the above description, by update information for each ECU including an engine state in which update processing is startable, starting software update processing of the ECU in an appropriate state is possible.

The steering lock state D31134 is identification information indicating a steering lock state in which program update of the ECU is startable and any one of "lock" and "- (Don't Care)" is set. For example, in a case where the steering lock state D31134 is set to "lock", update is not executed in a case where a steering lock state of the vehicle acquired by the update control unit 11011 of the software updating apparatus 11 is other than "lock". As in the above description, by update information for each ECU including a steering lock state in which update processing is startable, starting software update processing of the ECU at an appropriate state is possible.

The gear state D31135 is identification information indicating a gear (shift lever) state in which program update of the ECU is startable and any one of "P (Parking)", "N (Neutral)", and "- (Don't Care)" is set. For example, in a case where the gear state D31135 is set to "P", update is not executed in a case where a gear state of the vehicle acquired by the update control unit 11011 of the software updating apparatus 11 is other than "P". As in the above description, by update information for each ECU including a gear state in which update processing is startable, starting software update processing of the ECU at an appropriate state is possible.

The brake state D31136 is identification information indicating a brake state in which program update of the ECU is startable and any one of "lock" and "- (Don't Care)" is set. For example, in a case where the brake state D31136 is set to "lock", update is not executed in a case where a brake state of the vehicle acquired by the update control unit 11011 of the software updating apparatus 11 is other than "lock". As in the above description, by update information for each ECU including a brake state in which update processing is startable, starting software update processing of the ECU at an appropriate state is possible.

The door lock state D31137 is identification information indicating a door state in which program update of the ECU is startable and any one of "lock", "open", and "- (Don't Care)" is set. For example, in a case where the door lock state D31137 is set to "lock", update is not executed in a case where a door lock state of the vehicle acquired by the update control unit 11011 of the software updating apparatus 11 is other than "lock". As in the above description, by update information for each ECU including a door lock state in which update processing is startable, starting software update processing of the ECU at an appropriate state is possible.

The charge state D31138 is identification information indicating a charge state in which program update of the ECU is startable, for example, in a plugin hybrid electric vehicle (PHEV), and anyone of "during charging", "not during charging", and "- (Don't Care)" is set. For example, in a case where the charge state D31138 is set to "during charging", update is not executed in a case where a charge state of the vehicle acquired by the update control unit 11011 of the software updating apparatus 11 is other than "during charging". As in the above description, by update information for each ECU including a charge state in which update processing is startable, starting software update processing of the ECU at an appropriate state is possible.

FIG. 16(*b*) is an example of a screen that presents a reason for not starting software update and a solution in a case of a state where the vehicle cannot start software update. G2011 is an example of displaying "Update is impossible during travelling. Please start updating after the vehicle is stopped." as a reason for update cessation from the updatability during travelling D31131 and a result of vehicle state determination. G2012 is an example of displaying "Update is impossible during engine operation. Please start updating after an engine stop." from the engine state D31133 and a result of vehicle state determination. G2013 is an example of displaying "Update is impossible when the shift lever is not at "P". Please start updating after the shift lever is put to "P"." from the gear state D31135 and a result of vehicle state determination. G2014 is an example of displaying "The emergency brake is not put on. Please start updating after the emergency brake is put on." from the brake state D31136 and a result of vehicle state determination. As in the above description, by the content of update cessation being presented to the user in a case where update cannot be started and update is ceased, the user can appropriately grasp a state of the vehicle and obtain information for transitioning the state of the vehicle to a state where software update is possible.

Example 4

In Example 1, a method responding to different application systems by changing the order (sequence) of transmitting a control request from the software updating apparatus 11 to the ECU, which is an update target, according to an application system included in update information has been described. In this example, a method responding to different application systems by issuing a request in the order common to each of the systems, with a control request being generated based on update information and the ECU, which is an update target, performing processing based on parameters included in the control request, will be described.

FIG. 17 is a configuration example of the application processing information D3120 of the ECU1 12 and a data transmission request transmitted from a software updating apparatus in this example to the ECU1 12. Herein, an example in which information necessary for writing is initially listed in all update target blocks and transmission data is combined behind the information will be described.

In a case where the application system is a difference application system or a compression application system, data sizes1 D31281 and D31291 indicate data sizes which are compressed or data sizes in which a difference is taken into account. Data sizes2 D31282 and D31292 indicate data sizes written in the ROM. In a case where the application system is a difference application system or a compression application system, sizes after restoration are set. Writing destination addresses D31283 and D31293 indicate writing destination addresses of a ROM to be written in the ECU, which is an update target. The content of the rest of configuration elements is the same as that of the application processing information D3120 of FIG. 7.

Data transmission request D1700 is configured with an application system D1701, a data size D1702, a writing destination address D1703. The application system D1701 is set to an application system indicating how to apply update in the ECU, which is an update target, and is set to identification information, including "normal", "difference", and "compression". The data size D1702 indicates a data size transmitted from the software updating apparatus 11 to the ECU1 12. The writing destination address D1703 indicates address information of a destination at which transmission data is to be written.

FIG. 18 is a sequence example of application processing with respect to one block (block number 3) in a case where update application processing is performed with the ECU1 12 based on the application processing information D3120 of FIG. 17.

FIG. 18(*a*) is a processing sequence between the software updating apparatus 11 and the ECU1 12 in this example.

The update control unit 11011 of the software updating apparatus 11 initially reads the update information 5 and configures a data transmission request based on the application processing information D3120 of FIG. 17 (S340). In the application system D1701 of the data transmission request D1700, "difference", which is the application system ID2 D3123 of the application processing information D3120 of FIG. 17, is set. In the data size D1702 of the data transmission request D1700, a value of the data size2 D31282 of the application processing information D3120 of FIG. 17 is set in a case where the application system D1701 is "normal" and a value of the data size1 D31281 of the application processing information D3120 of FIG. 17 is set in a case where the application system D1701 is other than "normal". In the writing destination address D1703 of the data transmission request D1700, a value of the writing destination address D31283 of the application processing information D3120 of FIG. 17 is set. After data is configured, the update control unit 11011 of the software updating apparatus 11 transmits the configured data transmission request D1700 to the ECU1 (S341). Once the data transmission request is received, the ECU1 implements data transmission request reception processing (S342) and transmits a reply to the software updating apparatus 11. Once the reply is received (S343), the software updating apparatus 11 reads the update data D3124 of the ECU1 from the application processing information D3120 (S344) and transmits the data to the ECU1 (S345). Once the update data is received, the ECU1 implements update data reception processing (S346) and transmits a reply to the software updating apparatus 11 (S347). Data transmissions S345 to S346 are repeated until the entire update data D3124 is transmitted. Once the entire update data D3124 is transmitted, the software updating apparatus 11 transmits a data transmission completion request (S348). Once the data transmission completion request is received, the ECU1 implements data transmission completion request reception processing (S349) and returns a reply to the software updating apparatus 11 (S350). Once the reply is received, the software updating apparatus 11 terminates processing with respect to this block (block number 3) and performs processing for the next block.

FIG. 18(*b*) is a flow chart of the data transmission request reception processing S342 in the ECU1. The ECU1 keeps information (the application system D1701, the data size D1702, and the writing destination address D1703) included in the initially received data transmission request D1700 (S3421). Whether or not the application system D1701 indicates "difference" is confirmed (S3422). In a case where the application system D1701 indicates other than "difference" (NO in S3422), a block of the ROM corresponding to the writing destination address D1703 is erased (S3423). In a case where the application system D1701 indicates "difference" (YES in S3422), processing is terminated as it is. In a case where an abnormality has occurred in information saving (S3421) and ROM block erasing (S3423) in the sequence of FIG. 18(b), the ECU1 12 returns an abnormality reply to the software updating apparatus 11.

FIG. 18(c) is a flow chart of the update data reception processing S346 in the ECU1. The ECU1 temporarily saves the received data in a random access memory (RAM) (S3461). Next, it is determined that whether or not the application system is a "difference" application system from the application system D1701 kept in S3421 (S3462). In a case where the application system D1701 indicates "difference" (YES in S3462), processing is terminated as it is. In a case where the application system D1701 indicates other than "difference" (NO in S3462), it is confirmed whether or not a data size saved in a temporary region is equal to or larger than a regular size (a region size of 512 Byte that can be secured as a temporary buffer) (S3463). In a case where the received size is smaller than the regular size (NO in S3463), it is determined whether or not the application system is a "normal" application system from the application system D1701 kept in S3421 (S3464). In a case where the received size is equal to or larger than the regular size (YES in S3463), processing is terminated as it is. In a case where the application system is other than "normal" (compression) application system (NO in S3464), the temporarily saved data is restored (S3465) and the restored data is written in the ROM (S3466). In a case where the application system is "normal" application system (YES in S3464), the temporarily saved data is written in the ROM as it is (S3466). In a case where an abnormality has occurred in temporarily saving (S3461), restoration (S3465), writing in the ROM (S3466) in the sequence of FIG. 18(c), the ECU1 12 returns an abnormality reply to the software updating apparatus 11.

FIG. 18(d) is a flow chart of the data transmission completion request reception processing S349 in the ECU1 12. The ECU1 12 determines whether or not the application system is a "difference" application system from the application system D1701 kept in S3421 (S3491). In a case where the application system is other than a "difference" application system (NO in S3491), the data written in the ROM is verified (S3496) and processing is terminated. In a case where the application system is a "difference" application system (YES in S3491), the temporarily saved data is restored (S3492) and verification of the restored data is performed before being written in the ROM (S3493). In a case where the verification has failed (NG in S3493), processing is terminated. In a case where the verification has succeeded (OK in S3493), the block of the ROM corresponding to the writing destination address D1703 kept in S3421 is erased (S3494) and the restored data is written at the writing destination address D1703 (S3495). After then, the data written in the ROM is verified (S3496) and processing is terminated. The ECU1 12 returns an abnormality reply to the software updating apparatus 11 in a case where an abnormality has occurred in difference restoration (S3492), ROM block erasing (S3494), and writing in the ROM (S3495), in addition to a case where data verification (S3493 or S3496) has failed, in the sequence of FIG. 18(d).

As in the above description, by the application processing information D3120 including an application system, a data size1 (data size after difference or compression), a data size2 (data size written in a ROM), a writing destination address, by a data transmission request to be transmitted to the ECU1 being configured based on the above information, and by the ECU receiving the request switching processing based on the content of the data transmission request, determination as to which type of system is to be used with respect to which type of ECU, including designating a processing system that varies depending on the timing of update or update content with respect to the same ECU, can be made at a time of application.

REFERENCE SIGNS LIST

1: vehicle, 2: server, 3: Internet, 4: access network, 5: update information, 10: in-car network, 11: software updating apparatus, 12: ECU1, 13: HMI, 14: power source management ECU, 1101, 1201: control unit, 1102: memory unit, 1104: time management unit, 1105: WAN I/F, 1106: low-speed in-car LAN I/F, 1107: high-speed in-car LAN I/F, 1202: sensor, 1203: actuator, 11010, 12010, 16010: control program, 11011: update control unit, 11012: external communication control unit, 11013: in-car communication control unit, 11014: high-speed in-car communication control unit, 12012, 16012: updating unit

The invention claimed is:

1. A software updating apparatus that is connected to a server and a plurality of control apparatuses and performs transmission and reception of data, the software updating apparatus comprising:

a hardware control unit coupled to a hardware memory, the hardware control unit involving one or more physical hardware processors, the hardware control unit configured to:

receive update control information, which includes update data for each of the plurality of control apparatuses and identification information for identifying an application method for applying the update data to the each of the plurality of control apparatuses, from the server;

transmit the update data to be applied, for each of the plurality of control apparatuses; and control the plurality of control apparatuses via a communication unit such that the update data is applied based on the identification information;

wherein the update control information comprises, for each of the plurality of control apparatuses, update data and Electronic Control Unit (ECU) information utilized in applying the update data to the each of the control apparatuses, the ECU update information comprising application method identified by the identification information indicating any one of a full update, a difference update, and a compression and decompression update of the each of the plurality of control apparatuses;

wherein, upon sending a data transfer request instructing start of transfer of the update data to the ECU to be updated, the hardware control unit is configured to set the data transfer request in an application system according to the application method, wherein the application method corresponding to the full update comprises block erasing of a Read Only Memory (ROM) corresponding to write addresses associated with the update data for the each of the control apparatuses;

wherein the application method corresponding to the difference update comprises caching of the update data by the each of the plurality of control apparatuses, a restoration process of the update data, a verification process of the update data and block erasing of the ROM upon confirmation by the verification process of the update data;

wherein the application method corresponding to the compression and decompression update comprises caching of the update data by the each of the plurality of control apparatuses, block erasing of the ROM corresponding to write addresses associated with the update data for the each of the control apparatuses, and a restoration process of the update data.

2. The software updating apparatus according to claim 1, wherein the application method identified by the identification information is designated in the unit of a logical block of a nonvolatile memory that stores software of the each of the plurality of control apparatuses.

3. The software updating apparatus according to claim 1, wherein the hardware control unit gives erasing instruction of a nonvolatile memory of the each of the plurality of control apparatuses after transmitting the update data to the control apparatus to which the update data is to be applied in a case where the identification information indicates the difference update.

4. The software updating apparatus according to claim 1, wherein the hardware control unit transmits the update data to the each of the plurality of control apparatuses after giving erasing instruction of a nonvolatile memory of the each of the plurality of control apparatuses to which the update data is to be applied in a case where the identification information indicates the full update.

5. The software updating apparatus according to claim 1, wherein the update control information includes power consumption information necessary for applying the update data to the each of the plurality of control apparatuses, and
the hardware control unit controls the plurality of control apparatuses based on a result of comparison between a battery level of a vehicle, which is acquired via the communication unit, and the power consumption information.

6. The software updating apparatus according to claim 1, wherein the update control information further comprises preprocessing information commonly applied to the plurality of control apparatuses;
wherein the preprocessing information comprises user permission necessity indicating whether it is necessary to execute user consent acquisition processing when executing a software update by over the air (OTA);
wherein the hardware control unit is configured to judge processing based on the user permission necessity;
wherein when the user permission necessity indicates that user consent acquisition is necessary, the hardware control unit transmits a user conformation request to a human machine interface (HMI).

7. The software updating apparatus according to claim 1, wherein the ECU update information includes identification information for uniquely identifying the control apparatus on an in-car network;
wherein the hardware control unit transmits and receives data to and from the control apparatus based on the identification information for uniquely identifying the control apparatus on the in-car network.

8. The software updating apparatus according to claim 1, wherein the ECU update information comprises a start condition, under which update processing can be started; and
wherein if a state of a vehicle does not meet the start condition, the hardware control unit configures a human machine interface (HMI) to display a condition of the state of the vehicle and instructions to handle the state of the vehicle.

9. A software updating method for performing transmission and reception of data to and from a plurality of control apparatuses, the software updating method comprising:
a first communication step of receiving update control information, which includes update data for each of the plurality of control apparatuses and identification information for identifying an application method for applying the update data to the control apparatus, from the server;
a second communication step of transmitting the update data to be applied, for each of the plurality of control apparatuses; and
an update control step of controlling the plurality of control apparatuses such that the update data is applied based on the identification information;
wherein the update control information comprises, for each of the plurality of control apparatuses, update data and Electronic Control Unit (ECU) information utilized in applying the update data to the each of the control apparatuses, the ECU update information comprising application method identified by the identification information indicating any one of a full update, a difference update, and a compression and decompression update of the each of the plurality of control apparatuses;
a setting data transfer request step of, upon sending a data transfer request instructing start of transfer of the update data to the ECU to be updated, setting the data transfer request in an application system according to the application method;
wherein the application method corresponding to the full update comprises block erasing of a Read Only Memory (ROM) corresponding to write addresses associated with the update data for the each of the plurality of control apparatuses;
wherein the application method corresponding to the difference update comprises caching of the update data by the each of the plurality of control apparatuses, a restoration process of the update data, a verification process of the update data and block erasing of the ROM upon confirmation by the verification process of the update data;
wherein the application method corresponding to the compression and decompression update comprises caching of the update data by the each of the plurality of control apparatuses, block erasing of the ROM corresponding to write addresses associated with the update data for the each of the control apparatuses, and a restoration process of the update data.

10. The software updating apparatus according to claim 1, wherein the ECU update information comprises an available band in in-car communication with the each of the plurality of control apparatuses; wherein the hardware control unit controls communication with the each of the plurality of control apparatuses to not exceed the available band.

11. The software updating apparatus according to claim 1, wherein the update control information comprises preprocessing information commonly applied to the plurality of control apparatuses;

wherein the preprocessing information includes update start timing information indicating timing for over the air (OTA) to execute a software update; and wherein the hardware control unit starts update processing based on the timing information.

\* \* \* \* \*